US012647716B2

(12) United States Patent
Jin et al.

(10) Patent No.: US 12,647,716 B2
(45) Date of Patent: Jun. 2, 2026

(54) WIRELESS SOUND DEVICE AND CONTROL METHOD THEREOF

(71) Applicant: LG ELECTRONICS INC., Seoul (KR)

(72) Inventors: Dongchul Jin, Seoul (KR); Sangwon Lee, Seoul (KR); Daesung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 18/717,388

(22) PCT Filed: Dec. 7, 2021

(86) PCT No.: PCT/KR2021/018439
§ 371 (c)(1),
(2) Date: Jun. 6, 2024

(87) PCT Pub. No.: WO2023/106439
PCT Pub. Date: Jun. 15, 2023

(65) Prior Publication Data
US 2025/0048021 A1 Feb. 6, 2025

(51) Int. Cl.
*H04R 1/10* (2026.01)

(52) U.S. Cl.
CPC ......... *H04R 1/1083* (2013.01); *H04R 1/1016* (2013.01); *H04R 2420/07* (2013.01); *H04R 2430/01* (2013.01); *H04R 2460/01* (2013.01)

(58) Field of Classification Search
CPC ............ H04R 2430/01; H04R 2420/07; H04R 1/1083; H04R 1/10; H04R 2460/01;
(Continued)

(56) References Cited

U.S. PATENT DOCUMENTS

2002/0141598 A1 10/2002 Vayrynen
2016/0086592 A1 3/2016 Saxman et al.

FOREIGN PATENT DOCUMENTS

CN 105208477 A 12/2015
KR 10-2016-0140161 A 12/2016
(Continued)

*Primary Examiner* — Kile O Blair
(74) *Attorney, Agent, or Firm* — Birch, Stewart, Kolasch & Birch, LLP

(57) ABSTRACT

The present invention relates to a wireless sound device and a control method thereof, in which at least one of sound volume adjustment and noise cancelling operation is appropriately selected according to a user's preference and/or situation so that noise according to an external ambient sound is reduced and a sound can be thus provided to the user. The present invention may provide a wireless sound device comprising: a wireless communication unit for performing wireless communication with a sound source device; a speaker for outputting a sound source signal received from the sound source device; an external microphone for picking up an ambient sound; an internal microphone for picking up an in-ear sound and internal noise; and a control unit for performing sound volume control and ANC control to reduce an influence of the internal noise, wherein the control unit performs control so that, when reduction in the internal noise is insufficient after one of the sound volume control and the ANC control is performed preferentially, the other of the sound volume control and the ANC control is further performed.

20 Claims, 20 Drawing Sheets

(58) Field of Classification Search
CPC ....... G10K 11/17825; G10K 11/17835; G10K 2210/3056
See application file for complete search history.

(56) References Cited

FOREIGN PATENT DOCUMENTS

| | | | | | |
|---|---|---|---|---|---|
| KR | 101888936 | B1 * | 8/2018 | ........... | G10K 11/178 |
| KR | 10-2019-0140457 | A | 12/2019 | | |

* cited by examiner

WIRELESS SOUND DEVICE AND CONTROL METHOD THEREOF

CROSS-REFERENCE TO RELATED APPLICATION

This application is the National Phase of PCT International Application No. PCT/KR2021/018439, filed on Dec. 7, 2021, which is hereby expressly incorporated by reference into the present application.

TECHNICAL FIELD

The present disclosure relates to a wireless sound device and a method for controlling the same that may provide sound to a user by reducing an influence of external noise when receiving a sound signal from a user terminal via wireless communication with the user terminal.

BACKGROUND

A sound device may refer to an electronic device that is coupled with a speaker for receiving a sound signal from a user terminal and outputting the same and a microphone for collecting an ambient sound (e.g., a user voice) and transmitting the same to a terminal. Examples thereof may include a headphone, an earphone, a headset, an earset, an earbud, and the like.

In the past, wired sound devices that receive the sound signal via wired connection to an ear jack terminal of the user terminal were widely used, but recently, a demand for wireless sound devices is increasing in terms of portability and convenience of use.

Recently, many wireless sound devices in a form of an earbud that are smaller in size and inserted into an ear have been developed. The wireless sound device in the form of the earbud that may be inserted into a user's ear may be equipped with a wireless communication unit and a battery therein and thus may perform wireless communication with an external terminal.

Especially when using the wireless sound device such as the earbud, when the ambient sound or external noise is loud, a sound of content such as music or broadcasting may be drowned in the noise, deteriorating sound quality, and in some cases, the content may have to be listened to again. To prevent such problem, to clearly provide the sound to the user, increasing a sound volume enough to dominate the external noise or lowering the noise level by activating noise canceling, for example, active noise cancellation (ANC) may be considered.

However, there is a disadvantage that increasing the sound volume too high or listening to audio at a high sound volume for a long time may cause a hearing damage to the user.

In addition, the ANC has a disadvantage that the user may feel dizzy because of an anti-phase sound wave of the noise generated to cancel out the noise.

Therefore, it is recommended that the sound volume adjustment and noise canceling operations are appropriately selected and used depending on the user's situation. However, when the user has to determine the current situation thereof and manually select one of the sound volume adjustment and noise canceling operations, this will inevitably be quite inconvenient for the user.

SUMMARY

Technical Problem

The present disclosure is to provide a wireless sound device and a method for controlling the same that may provide a sound to a user by reducing noise caused by an external ambient sound as at least one of sound volume adjustment and noise canceling operations is appropriately selected depending on a preference and/or a situation of a user.

Technical Solutions

According to an aspect of the present disclosure to achieve the above purpose, provided is a wireless sound device including a wireless communication unit for being in wireless communication with a sound source device, a speaker for outputting a sound source signal received from the sound source device, an external microphone for picking up an ambient sound, an internal microphone for picking up a sound source and an internal noise inside an ear, and a controller for performing sound volume control and ANC control to reduce an influence of the internal noise, wherein the controller performs one of the sound volume control and the ANC control first, and then further performs the other of the sound volume control and the ANC control when the reduction of the internal noise is insufficient.

The controller may perform the sound volume control first, and perform the ANC control when the reduction of the internal noise is insufficient even though a level of the picked up sound source reaches a safety critical level during the sound volume control.

The controller may perform the ANC control first, and perform the sound volume control when the reduction of the internal noise is insufficient even though a level of an anti-phase sound wave for the ANC control reaches a maximum allowable level during the ANC control.

The controller may perform one of the sound volume control and the ANC control first based on a preset user's preferred scheme when a level of the internal noise is equal to or higher than a preset threshold.

The controller may perform one of the sound volume control and the ANC control first based further on a pattern of the internal noise.

The controller may perform the sound volume control first without considering the user's preferred scheme when the pattern of the internal noise is unsuitable for the ANC control.

The controller may perform one of the sound volume control and the ANC control first in consideration of the user's preferred scheme when the pattern of the internal noise is suitable for the ANC control.

The controller may perform one of the sound volume control and the ANC control first based on a pattern of the internal noise.

The controller may perform one of the sound volume control and the ANC control first based on the user's preferred scheme when a volume adjustment command to increase a sound volume is input.

The user's preferred scheme may be automatically determined based on at least one of user's movement information, sound source information, and sound adjustment history information.

Further, according to another aspect of the present disclosure to achieve the above purpose, provided is a method for controlling a wireless sound device including performing wireless communication with a sound source device, outputting a sound source signal received from the sound source device via a speaker, picking up an ambient sound via an external microphone, picking up a sound source and an internal noise inside an ear via an internal microphone, and performing sound volume control and ANC control to reduce an influence of the internal noise, wherein one of the sound volume control and the ANC control is performed first, and then the other of the sound volume control and the ANC control is further performed when the reduction of the internal noise is insufficient.

Advantageous Effects

Effects of the wireless sound device and the method for controlling the same according to the present disclosure will be described as follows.

According to at least one of the embodiments of the present disclosure, at least one of the sound volume control and the noise cancellation control may be performed first based on the user's preference and/or the noise pattern to reduce the influence of the noise, thereby providing the user with the clean sound.

Additional scope of applicability of the present disclosure will become apparent from the detailed description below. However, because various changes and modifications within the spirit and scope of the present disclosure may be clearly understood by those skilled in the art, the detailed description and specific embodiments, such as preferred embodiments of the present disclosure, should be understood as given only as examples.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

As the terms used herein, currently widely used general terms were selected as much as possible while considering their functions in the present disclosure. However, this may vary depending on the intention of the technician working in the field, practice, emergence of new technology, or the like. In addition, in certain cases, there will be terms arbitrarily selected by the applicant, and in this case, meanings thereof will be described in the description of the relevant invention. Therefore, the terms used herein should be interpreted based on the actual meanings thereof and the overall content of the present document, not based on the names thereof.

Figure 1:
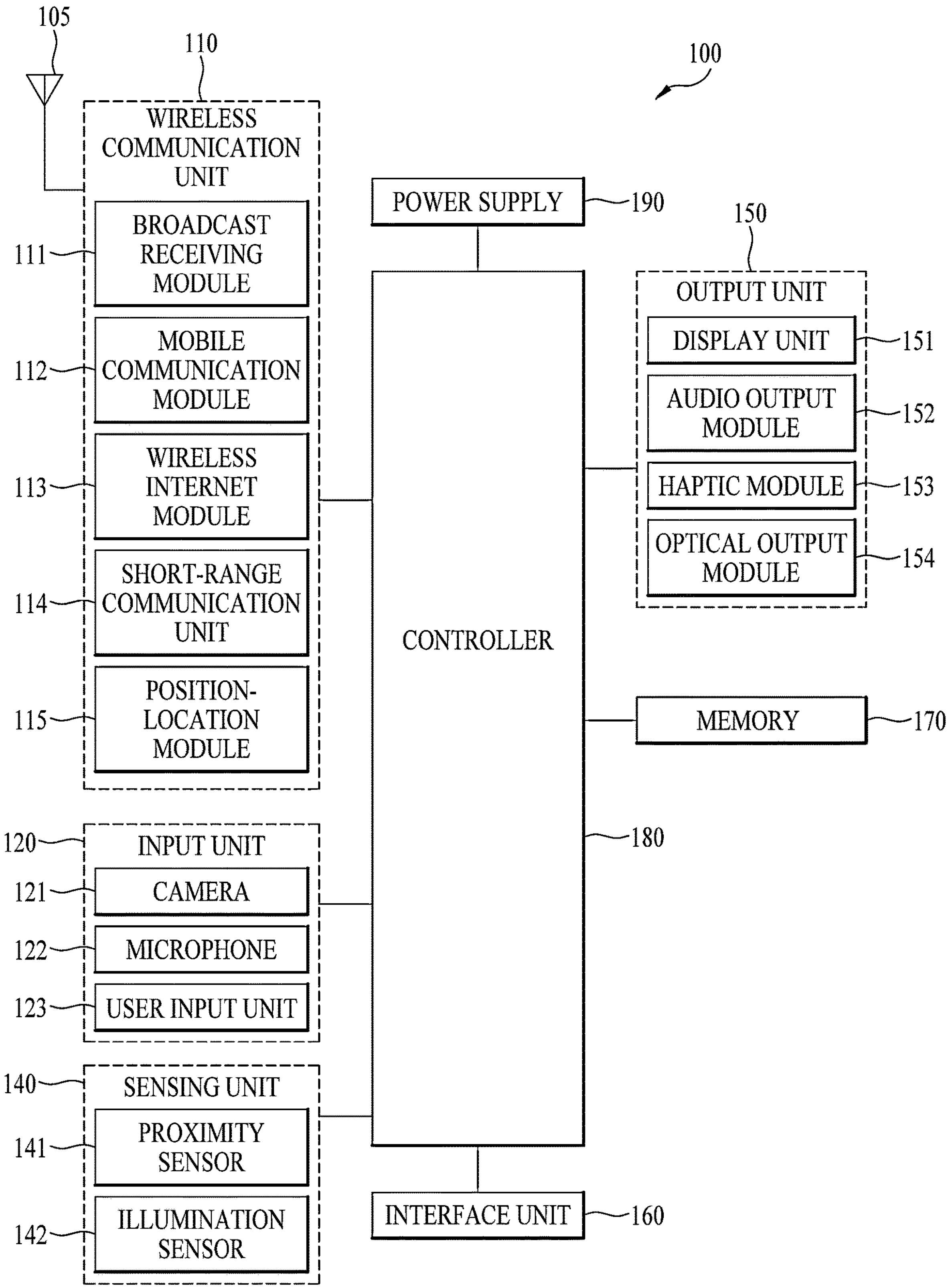
FIG. 1 is a schematic block diagram of a user terminal according to an embodiment of the present disclosure.

Reference is now made to FIG. 1, where FIG. 1 is a block diagram of a user terminal in accordance with the present disclosure, The user terminal 100 is shown having components such as a wireless communication unit 110, an input unit 120, a sensing unit 140, an output unit 150, an interface unit 160, a memory 170, a controller 180, and a power supply unit 190.

The components in FIG. 1 may be integrated, added, or omitted depending on specifications of the user terminal 100 that is actually implemented. That is, as needed, two or more components may be combined into one component or one component may be subdivided into two or more components. Additionally, a function performed in each block is intended to describe an embodiment of the present disclosure, and a specific operation or device thereof does not limit the scope of rights of the present disclosure.

The wireless communication unit 110 typically includes one or more modules which permit communications such as wireless communications between the user terminal 100 and a wireless communication system, communications between the user terminal 100 and another user terminal, communications between the user terminal 100 and an external server. Further, the wireless communication unit 110 typically includes one or more modules which connect the user terminal 100 to one or more networks.

The wireless communication unit 110 may include a broadcast reception module 111 for receiving a broadcast signal and/or broadcast-related information from an external broadcast management server via a broadcast channel, a mobile communication module 112 for transmitting and receiving a wireless signal with at least one of a base station, an external terminal, and a server on a mobile communication network built based on technical standards or communication schemes for mobile communication (e.g., long term evolution (LTE), long term evolution-advanced (LTE-A), 5G, and the like), a wireless Internet module 113 for wireless Internet access, a short-range communication module 114 for short-range communication (e.g., Bluetooth (Bluetooth™), infrared data association (IrDA), near field communication (NFC), wireless-fidelity (Wi-Fi), and the like), and a location information module 115 (e.g., a global positioning system (GPS) module) for acquiring a location (or a current location) of the user terminal.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the user terminal, the surrounding environment of the user terminal, user information, and the like. The sensing unit 140 is shown having a proximity sensor 141 and an illumination sensor 142.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the user terminal 100 and a user, as well as function as the user input unit 123 which provides an input interface between the user terminal 100 and the user.

The interface unit 160 serves as an interface with various types of external devices that can be coupled to the user terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the user terminal 100 may perform assorted control functions associated with a connected external device, in response to the external device being connected to the interface unit 160.

The memory 170 is typically implemented to store data to support various functions or features of the user terminal 100. For instance, the memory 170 may be configured to store application programs executed in the user terminal 100, data or instructions for operations of the user terminal 100, and the like.

The controller 180 typically functions to control overall operation of the user terminal 100, in addition to the operations associated with the application programs.

The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the user terminal 100. The power supply unit 190 may include a battery, and the battery may be configured to be embedded in the terminal body, or configured to be detachable from the terminal body.

At least some of the above components may cooperate with each other to implement an operation, control, or a control method of the user terminal according to various embodiments to be described below. Additionally, the operation, the control, or the control method of the user terminal may be realized on the user terminal by running at least one application program stored in the memory 170.

In one example, the various embodiments below may be implemented in a recording medium that may be read by a computer or a device similar thereto using, for example, software, hardware, or a combination thereof.

The user terminal 100 constructed as such may operate as a sound source device. That is, the user terminal 100 may play a multimedia file such as an audio or a video stored in the memory 170 or receive a multimedia content streaming signal via the wireless communication unit 110 to generate a sound source signal, and transmit the generated sound source signal to a wireless sound device connected to the user terminal 100 via the wireless communication. The wireless sound device may receive the sound source signal, convert the sound source signal into an audio signal, and output the audio signal. The wireless sound device will be described further with reference to FIG. 2.

Figure 2:
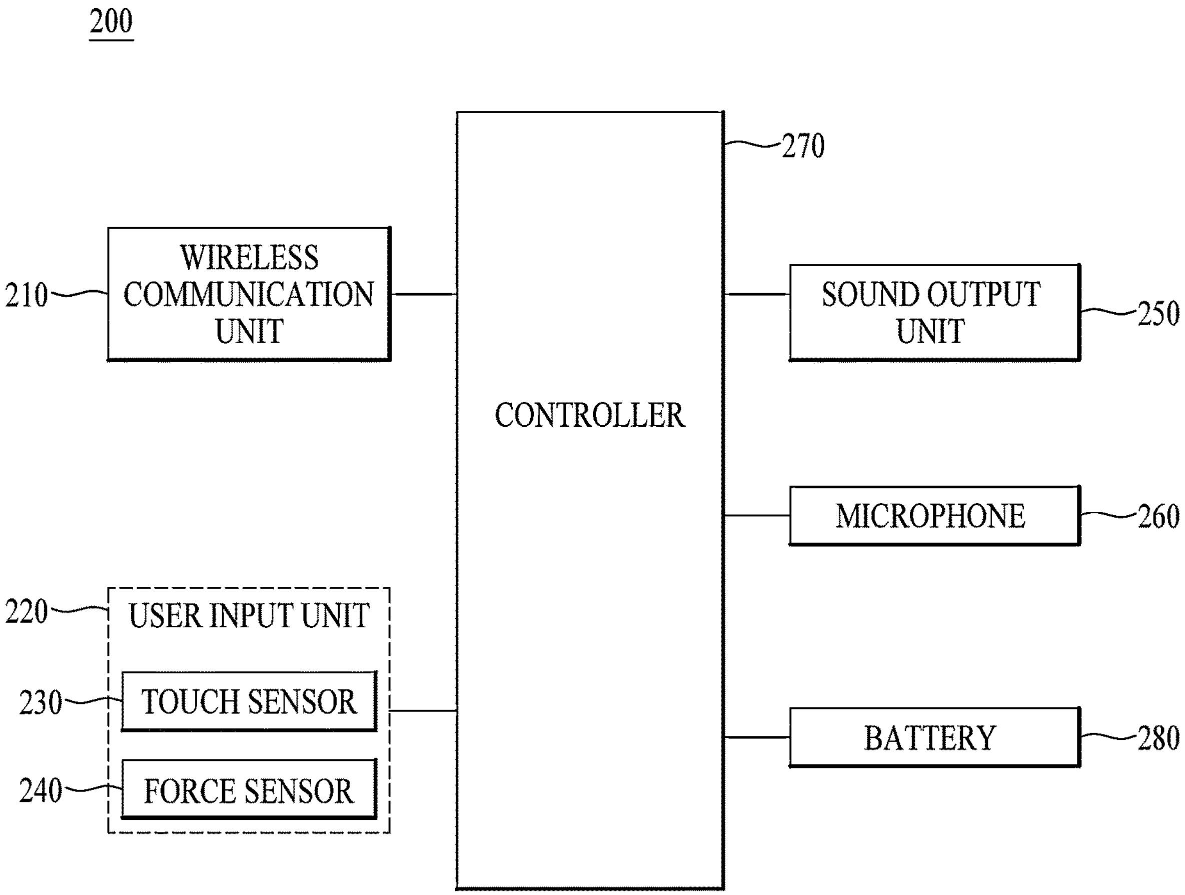
FIG. 2 is a schematic block diagram of a wireless sound device according to an embodiment of the present disclosure.

FIG. 2 is a schematic block diagram of a wireless sound device according to an embodiment of the present disclosure.

Referring to FIG. 2, the wireless sound device 200 according to an embodiment of the present disclosure may include a wireless communication unit 210, a user input unit 220, a sound output unit 250, a microphone 260, a controller 270, and a battery 280.

The components in FIG. 2 may be integrated, added, or omitted depending on specifications of the wireless sound device that is actually implemented. That is, as needed, two or more components may be combined into one component or one component may be subdivided into two or more components. Additionally, a function performed in each block is intended to describe an embodiment of the present disclosure, and a specific operation or device thereof does not limit the scope of rights of the present disclosure.

The wireless communication unit 210, as, for example, a module for being connected to an external terminal such as a smartphone or performing wireless communication with a server, may use different communication schemes depending on a wireless communication target, a distance, a data amount, and/or a speed. The communication scheme mainly used in the wireless sound device 200 is short-distance wireless communication.

As short-range communication schemes, there are Bluetooth (Bluetooth™), radio frequency identification (RFID), infrared data association (IrDA), ultra wideband (UWB), ZigBee, near field communication (NFC), wireless-fidelity (Wi-Fi), Wi-Fi Direct, wireless universal serial bus (Wireless USB), and the like.

A terminal that may be in communication with the wireless sound device 200 may be sensed (or recognized) around the wireless sound device 200. Furthermore, when the sensed terminal is a terminal authorized to be in communication with the wireless sound device 200 according to the present disclosure, the controller 270 may transmit at least a portion of data processed by the wireless sound device 200 to the terminal via the wireless communication unit 210.

Therefore, a user of the wireless sound device 200 may use data processed in an external terminal, such as a mobile terminal, via the wireless sound device 200. For example, when a call is received on the mobile terminal, the user may make the phone call via the wireless sound device 200, or when a message is received on the mobile terminal, the user may check the received message via the wireless sound device 200.

The user input unit 220 is for receiving information from the user. When the information is input via the user input unit 210, the controller 270 may control an operation of the wireless sound device 200 to correspond to the input information. Such user input unit 220 may include a touch sensor 230 and a force sensor 240.

The touch sensor 230 may sense a touch (or a touch input) applied onto the touch sensor 230 using at least one of several touch schemes such as a resistive scheme, a capacitive scheme, an infrared scheme, an ultrasonic scheme, and a magnetic field scheme.

As an example, the capacitive touch sensor 230 may convert a change in a pressure applied to a specific portion of the touch sensor 230 or a change in capacitance occurring in the specific portion into an electrical input signal. The touch sensor 230 may detect a location and an area size of touch applied by a touch object onto the touch sensor, a pressure during the touch, a capacitance during the touch, and the like. Here, the touch object, as a conductive object that applies the touch onto the touch sensor, may be, for example, a finger.

As such, when there is the touch input onto the touch sensor 230, a signal(s) corresponding thereto is transmitted to a touch controller. The touch controller processes the signal(s) and then transmits data corresponding thereto to the controller 270. As a result, the controller 170 may identify which area of the touch sensor has been touched. Here, the touch controller may be a separate component from the controller 270 or may be the controller 270 itself.

The force sensor 240 may sense a pressure or a force applied by a user's touch. For example, the force sensor 240 may sense a change in capacitance caused by a force or a pressure applied by an external object, and calculate the pressure applied by the user's touch based on the corresponding change in the capacitance. An intensity, a speed, a location, and/or a direction of the pressure may be provided to the controller 270.

The force sensor 240 may be implemented as a single component (e.g., one-chip) with the touch sensor, or the force sensor 240 and the touch sensor may be implemented as separate components.

The sound output unit 250 may convert and output audio data received from the wireless communication unit 210 or stored in a memory and sound received from the microphone 260 in a call signal reception mode, a call mode or recording mode, a voice recognition mode, a broadcast reception mode, etc. The sound output unit 250 may output a sound signal related to a call signal reception sound, a message reception sound, etc.

The sound output unit 250 is a converter that coverts an electric signal to sound, and includes main components such as a diaphragm, a voice coil and a magnet.

The diaphragm is a thin vinyl film, and generates sound by changing a flow of the air through its vibration. In order to process all frequency bandwidths from a low bandwidth to a high bandwidth by using one diaphragm, the diaphragm may be coated with a specific material by a method such as steam compression.

The magnet is made of ferrite, aliquot (alloy of Fe, Ni, Al and Co), samarium-cobalt, and neodymium (Nd), and is generally made of a donut shape. The magnet forms a magnetic field, and the voice coil is arranged within the magnetic field formed by the magnet.

The voice coil is a coil attached to the diaphragm, and a current flows to the voice coil in accordance with a sound signal. If the current flowing to the voice coil within the magnetic field formed by the magnet is changed, a force is applied to the voice coil by electromagnetic induction, whereby the diaphragm moves. That is, the current flowing to the voice coil is changed in accordance with the sound signal, and therefore the diaphragm moves, whereby the sound signal is implemented as sound and then the sound is provided to the user.

The microphone 260 processes an external sound signal to electric audio data. The processed audio data may be used in various ways in accordance with a function performed in the wireless sound device 200 or an application program executed in the wireless sound device 200. Meanwhile, various noise cancelling algorithms for cancelling noise generated in the middle of receiving an external sound signal may be implemented in the microphone 260.

Two or more microphones 260 may be provided to implement noise cancelling, and a user's voice or peripheral noise may be determined based on sound varied depending on the position of the microphone 260.

Also, the microphone 260 may amplify external sound which is recognized and then provide the amplified sound through the sound output unit 250, whereby the microphone 260 may serve as an aid that complements hearing of a user whose hearing is bad.

The controller 270 controls the wireless communication unit 210 and the sound output unit 250 based on the control signal received from the microphone 260 and the user input unit 220. The controller 270 may amplify sound received from the microphone 260 and output the amplified sound to the sound output unit 250, or may control the sound output unit 250 in accordance with sound data received through the wireless communication unit 210 to provide the user with music or call sound. Also, the controller 270 may control the operation of the wireless sound device 200 based on the signal input from the user input unit 220 or transmit the control signal input from the user input unit 220 to an external terminal through the wireless communication unit 210.

The battery 280 may supply a power source to each electronic component under the control of the controller 270, and may charge an external power source through a charging terminal. The charging terminal may serve as an interface that transmits and receives data.

A secondary battery that may be packaged in a small space and may be charged and discharged may be used as the battery 280. A main example of the battery 280 may include a lithium ion battery. The lithium ion battery includes a pair of electrodes comprised of a cathode and an anode, and an electrolyte arranged between the electrodes. Oxidation-reduction reaction occurs between the electrolyte and the electrodes and electrons move to supply a power source.

Figure 3:
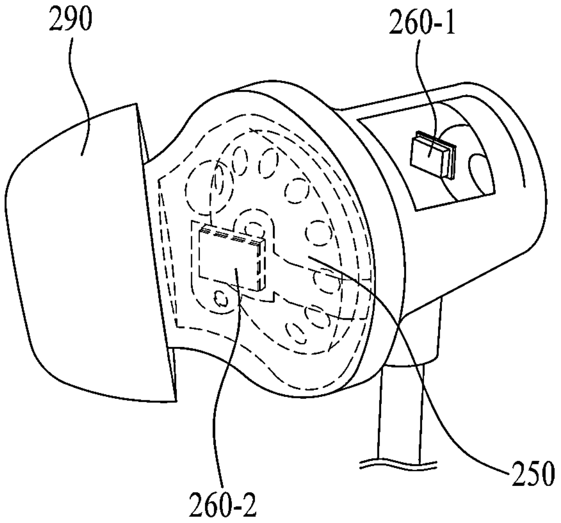
FIG. 3 shows an outer appearance of a wireless sound device according to an embodiment of the present disclosure.

Hereinafter, with reference to FIG. 3, an outer appearance of the wireless sound device 200 according to an embodiment of the present disclosure will be described. FIG. 3 shows an outer appearance of a wireless sound device according to an embodiment of the present disclosure.

FIG. 3 illustrates the wireless sound device 200 in a form of an earbud shown such that a partial housing thereof is transparently shown for a purpose of illustrating internal parts or components.

The wireless sound device 200 may include an external microphone (i.e., external mic) 260-1 for picking up an external sound such as an ambient sound and converting the sound into electrical audio data, and an internal microphone (i.e., internal mic) 260-2 for picking up an internal sound inside a user's ear and converting the sound into electrical audio data. Although not shown, the wireless sound device 200 may also be equipped with a separate voice microphone to pick up a user's voice.

The wireless sound device 200 may be equipped with the sound output unit 250, that is, a speaker, for converting the sound source signal received from the user terminal 100 into the audio signal and outputting the audio signal.

In addition, the wireless sound device 200 may be equipped with an eartip 290 to passively block external noise from entering the ear when the wireless sound device 200 is worn in the user's ear.

FIG. 3 shows the earbud-type wireless sound device 200 as an example, but the present disclosure may also be applied to other types of wireless sound devices other than the earbud-type.

However, the passive blocking using the ear tip 290 may not be of much help against the external noise mainly encountered in daily life. This will be described further with reference to FIG. 4.

Figure 4:
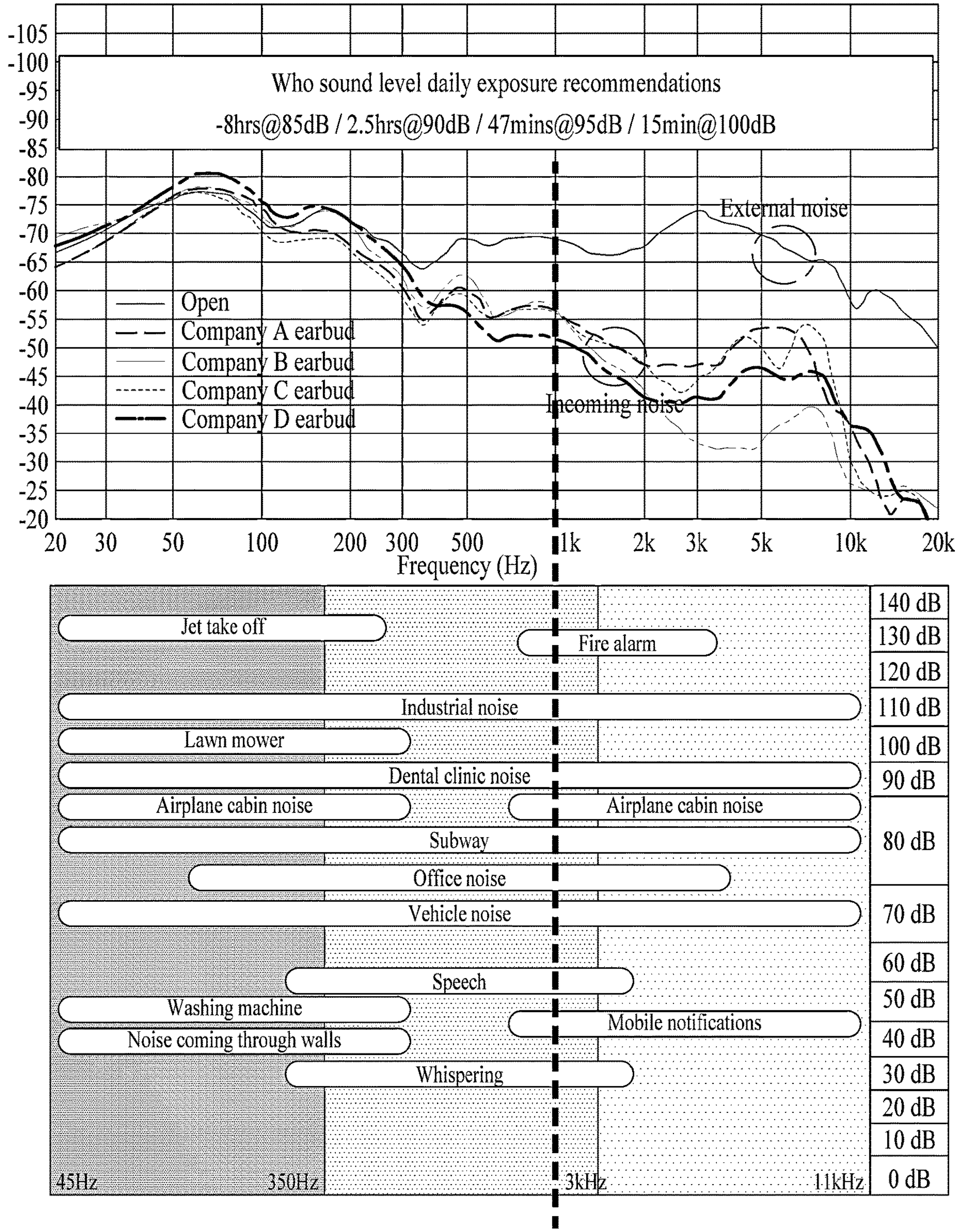
FIG. 4 is a graph showing a passive blocking effect based on an eartip against external noise within an audible frequency band.

FIG. 4 is a graph showing a passive blocking effect based on an eartip against external noise within an audible frequency band.

The external noise that is frequently encountered in the daily life is caused by a subway, a car, and a home appliance and is mostly distributed within a band equal to or lower than 1 kHz. However, as shown in FIG. 3, the passive blocking effect based on the eartip may not be great against the external noise within the band equal to or lower than 1 kHz.

Therefore, to effectively reduce the influence of the external noise, it is necessary to increase a sound volume of the wireless sound device or operate the ANC.

FIG. 4 illustrates sound level daily exposure recommendations from the World Health Organization (WHO) to prevent a hearing damage. For example, the World Health Organization recommends listening to 85 dB sounds for 8 hours or less a day, 95 dB sounds for 47 minutes or less a day, and 100 dB sounds for 15 minutes or less a day.

Figure 5:
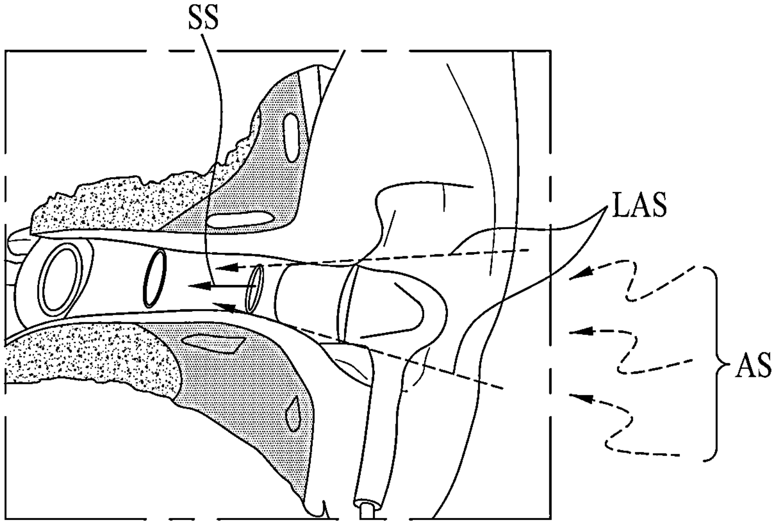
FIG. 5 shows the user wearing the wireless sound device according to an embodiment of the present disclosure.

Hereinafter, with reference to FIG. 5, a sound that the user may hear while wearing the wireless sound device 200 operating the ANC in the ear will be described. FIG. 5 shows the user wearing the wireless sound device according to an embodiment of the present disclosure.

While wearing the wireless sound device 200, the user may hear a speaker sound SS output from the wireless sound device 200, that is, the speaker 250.

When there is an ambient sound AS around the user, a portion of the ambient sound AS may be introduced into the user's ear. The incoming ambient sound (leaked ambient sound; LAS) may be heard by the user along with the speaker sound SS as the external noise.

When the ANC is operating, the speaker sound SS may include not only a sound of a multimedia content, that is, a sound source, but also a noise canceling sound to attenuate the external noise.

Figure 6:
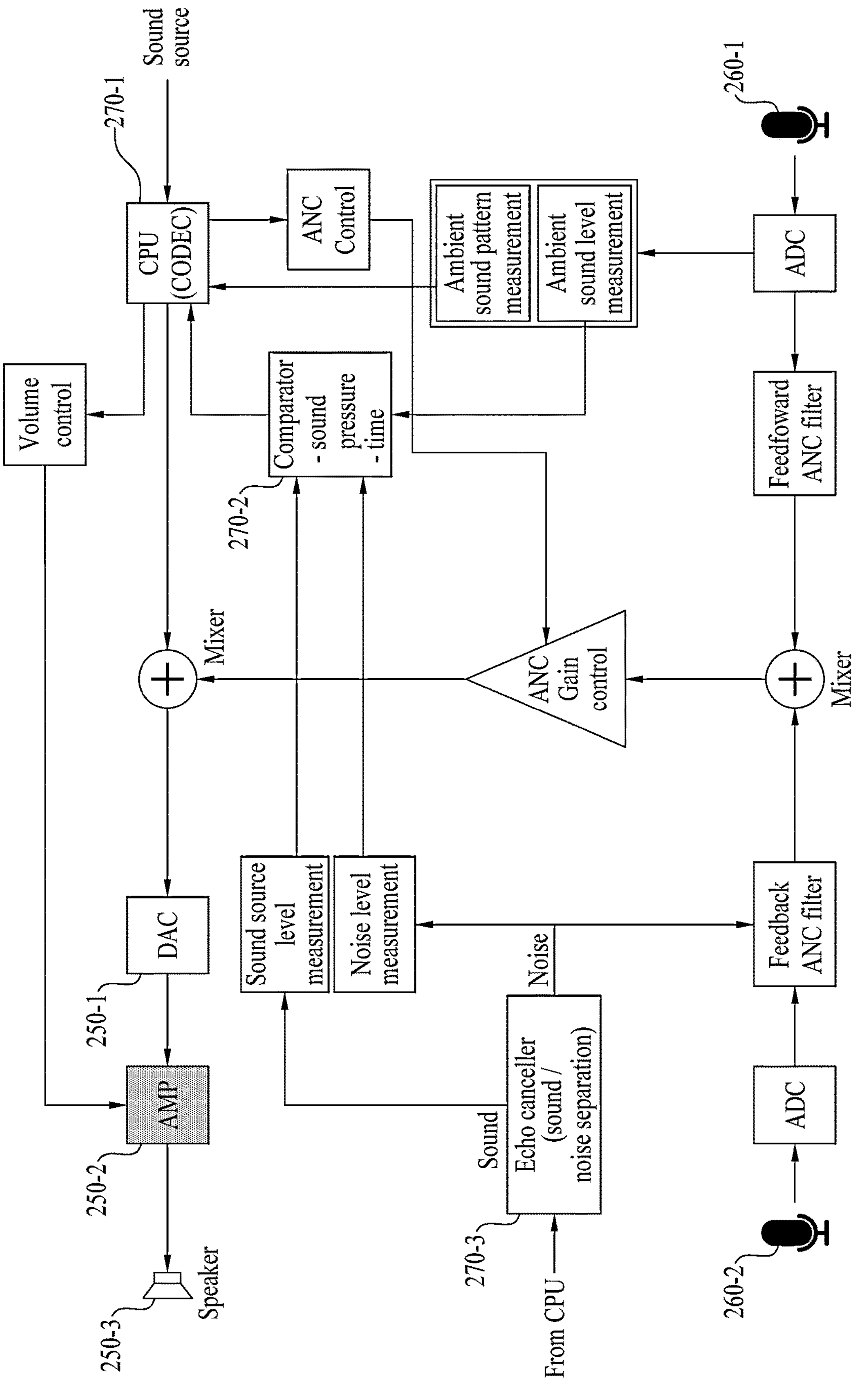
FIG. 6 is a detailed block diagram of a wireless sound device in FIG. 2 from a perspective of an operation to reduce an influence of external noise.

As described above, to effectively reduce the influence of the external noise, it is necessary to increase the sound volume of the wireless sound device 200 or operate the ANC. Hereinafter, with reference to FIG. 6, the wireless sound device 200 will be described from a perspective of an operation to reduce the influence of the external noise. FIG. 6 is a detailed block diagram of a wireless sound device in FIG. 2 from a perspective of an operation to reduce an influence of external noise.

First, a pattern and a level of the ambient sound (or the external noise) picked up by the external microphone 260-1 are measured, so that the pattern of the ambient sound may be transmitted to a CPU 270-1 and the level of the ambient sound may be transmitted to a comparator 270-2. The CPU 270-1 and the comparator 270-2 may constitute at least a portion of the controller 270. Hereinafter, the pattern may refer to a waveform and/or a frequency of a sound wave. Further, the level may refer to a magnitude of the sound wave or a volume of a sound.

The CPU 270-1 may receive the sound source signal from the sound source device 100 and transmit the received sound source signal to an echo canceller 270-3. The echo canceller 270-3 may be constructed as a portion of the controller 270 or may be constructed as a separate entity from the controller 270.

In one example, the echo canceller 270-3 may divide the internal sound inside the user's ear picked up by the internal microphone 260-2 into the sound source and the noise using the sound source signal. The divided noise may be resulted from the ambient sound or the external noise introduced into the user's ear.

A level of the sound source and a level of the noise may be measured and provided to the comparator 270-2.

The comparator 270-2 may compare the level of the ambient sound, the level of the sound source, and the level of the noise with each other and provide the comparison value to the CPU 270-1.

When the received sound source signal is output to a speaker 250-3 through a DAC 250-1 and an amplifier 250-2, the CPU 270-1 may control a level of a sound volume of the speaker 250-3 via the amplifier 250-2 based on the comparison value. Hereinafter, this will be referred to as "sound volume adjustment".

In one example, an anti-phase sound wave signal for the ANC may be generated based on the ambient sound picked up by the external microphone 260-1 and the internal sound inside the user's ear picked up by the internal microphone 260-2, and may be mixed with the sound source signal transmitted to the DAC 250-1. In this regard, the CPU 270-1 may control a magnitude of the anti-phase sound wave signal based on the pattern of the ambient sound and the comparison value. Hereinafter, this will be referred to as "ANC control".

Figure 7:
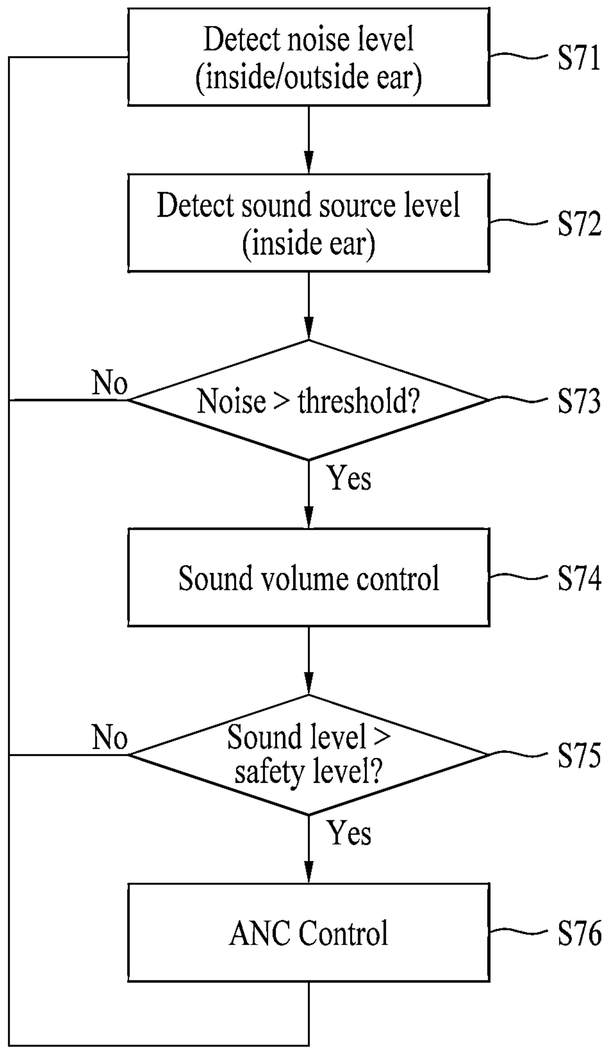
FIG. 7 is an external noise reduction process that may be performed by a wireless sound device according to an embodiment of the present disclosure.

A process for reducing the influence of the external noise that may be performed by the wireless sound device 200 constructed as above will be described with further reference to FIG. 7. FIG. 7 is an external noise reduction process that may be performed by a wireless sound device according to an embodiment of the present disclosure.

The wireless sound device 200 (i.e., the controller 270) may detect the level of the external noise and a level of an internal noise inside the user's ear caused by the introduction of the external noise via the external microphone 260-1 and the internal microphone 260-2 [S71].

Additionally, the wireless sound device 200 may detect a sound source level inside the user's ear via the internal microphone 260-2 [S72].

Step S71 and step S72 may be performed in a reverse order or may be performed virtually simultaneously.

The wireless sound device 200 may determine whether the internal noise level relative to the detected sound source level is equal to or higher than a preset threshold [S73]. There may be various schemes to perform the determination, but as an example, the determination may be performed in a scheme of determining whether an SNR value between the detected sound source level and the internal noise level is equal to or higher than the preset threshold.

When the internal noise level is lower than the threshold as the determination result, the process may return to step S71.

However, when the internal noise level is equal to or higher than the threshold as the determination result, the wireless sound device 200 may perform the sound volume control [S74].

That is, the wireless sound device 200 may increase the sound source level such that the internal noise level relative to the detected sound source level becomes lower than the preset threshold. That is, the wireless sound device 200 may make an influence of the internal noise insignificant by allowing the sound source level to be sufficiently high to dominate the internal noise level.

In this regard, in increasing the sound source level such that the internal noise level relative to the detected sound source level becomes lower than the preset threshold, the wireless sound device 200 may monitor whether the sound source level is equal to or higher than a predetermined level (hereinafter, referred to as a "safety level" or a "safety critical level") that is safe to prevent a hearing damage to the user [S75]. The safety level is as described above in relation to FIG. 4. The safety level may be set as default when the wireless sound device 200 is shipped from the factory or may be a level that may be set by the user via a settings menu for the wireless sound device 200 in the user terminal 100 that is connected to the wireless sound device 200 via the wireless communication.

When the sound source level is monitored to be lower than the safety level, step S71 may be performed to perform the sound volume control such that the internal noise level relative to the detected sound source level becomes lower than the preset threshold.

When the sound source level is monitored to be equal to or higher than the safety level, the wireless sound device 200 may perform the ANC control while performing the sound volume control at a level that no longer increases the sound source level or volume, thereby allowing the internal noise level relative to the detected sound source level to be lower than the preset threshold [S76].

Figure 8:
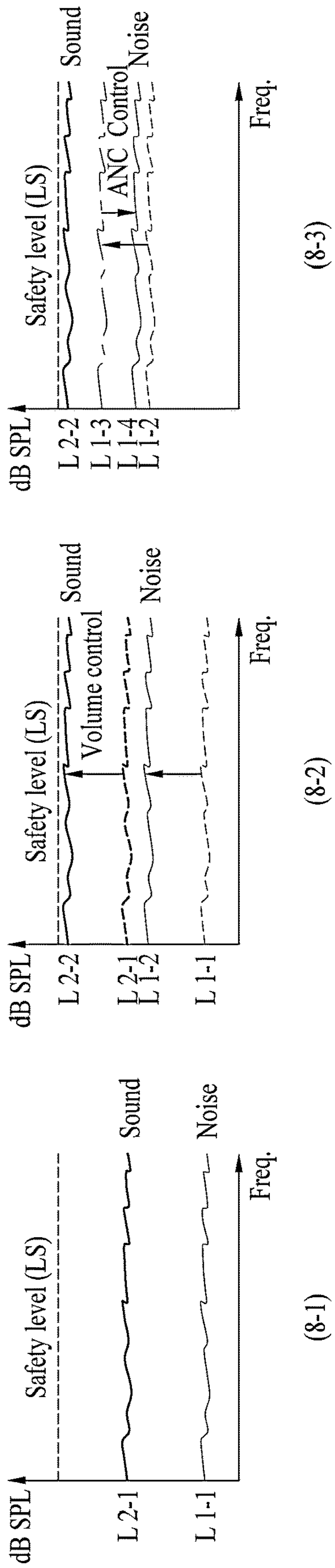
FIG. 8 is a graph for describing an external noise reduction process in FIG. 7.

Hereinafter, with further reference to FIG. 8, the external noise reduction process in FIG. 7 will be described. FIG. 8 is a graph for describing an external noise reduction process in FIG. 7.

(8-1) in FIG. 8 shows an internal noise level L1-1 and a sound source level L2-1 detected in the wireless sound device 200, assuming that the wireless sound device 200 worn by the user is located in a space with relatively less ambient sound. Because the space has the relatively less ambient sound, the wireless sound device 200 may not need to perform any of the sound volume control and the ANC control.

As shown in (8-2) in FIG. 8, when the internal noise level increases (from L1-1 to L1-2) as the ambient sound increases, the wireless sound device 200 may perform the sound volume control first. That is, the wireless sound device 200 may increase the volume of the sound source (from L2-1 to L2-2) so as to dominate the internal noise level while the sound source level does not exceed a safety level LS.

In this regard, when the ambient sound further increases and thus the internal noise level further increases (from L1-2 to L1-3), even when the wireless sound device 200 increases the sound source level up to the safety level, the sound source level may not be able to dominate the internal noise level. In this case, as shown in (8-3) in FIG. 8, the wireless sound device 200 may perform the ANC control while maintaining the sound source level so as not to exceed the safety level LS. As the ANC control is performed, the internal noise level may be reduced (from L1-3 to L1-4).

Figure 9:
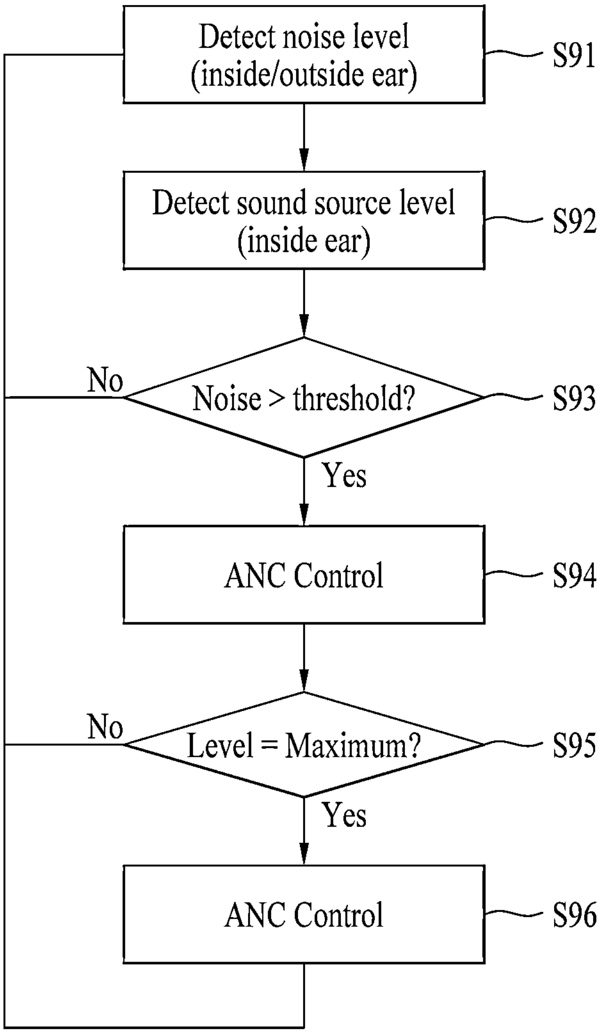
FIG. 9 is an external noise reduction process that may be performed in a wireless sound device according to an embodiment of the present disclosure.

It has been described that, as the level of the internal noise increases, the sound volume control is performed, and then the ANC control is performed as necessary. However, the present disclosure is not limited thereto. As the internal noise level increases, the ANC control may be performed, and then the sound volume control may be performed as needed. This will be described further with reference to FIG. 9. FIG. 9 is an external noise reduction process that may be performed in a wireless sound device according to an embodiment of the present disclosure.

The wireless sound device 200 may detect the level of the external noise and the level of the internal noise inside the user's ear via the external microphone 260-1 and the internal microphone 260-2 [S91].

Additionally, the wireless sound device 200 may detect the sound source level in the user's ear via the internal microphone 260-2 [S92].

Step S91 and step S92 may be performed in a reverse order or may be performed virtually simultaneously.

The wireless sound device 200 may determine whether the internal noise level relative to the detected sound source level is equal to or higher than the preset threshold [S93]. There may be various schemes to perform the determination, but as an example, the determination may be performed in the scheme of determining whether the SNR value between the detected sound source level and the internal noise level is equal to or higher than the preset threshold.

When the internal noise level is lower than the threshold as the determination result, the process may return to step S91.

However, when the internal noise level is equal to or higher than the threshold as the determination result, the wireless sound device 200 may perform the ANC control [S94].

That is, the wireless sound device 200 may output the anti-phase sound wave for the ANC control via the speaker 250 such that the internal noise level relative to the detected sound source level is lower than the preset threshold. That is, the wireless sound device 200 may lower the internal noise level with the anti-phase sound wave, so that the influence of the internal noise becomes insignificant.

In this regard, in increasing a level of the anti-phase sound wave such that the internal noise level relative to the detected sound source level is lower than the preset threshold, the wireless sound device 200 may monitor whether the level of the anti-phase sound wave reaches a maximum allowable value or allowable level [S95]. The maximum allowable value may be set as default when the wireless sound device 200 is shipped from the factory or may be set by the user via the settings menu for the wireless sound device 200 in the user terminal 100 that is connected to the wireless sound device 200 via the communication.

When the anti-phase sound wave level is monitored not to be the maximum allowable value, step S91 may be performed and the ANC control may be performed such that the internal noise level relative to the detected sound source level is lower than the preset threshold.

When the anti-phase sound wave level is monitored to be the maximum allowable value, the wireless sound device 200 may perform the sound volume control while performing the ANC control at a level that no longer increases the anti-phase sound wave level, thereby allowing the internal noise level relative to the detected sound source level to be lower than the preset threshold [S96].

Figure 10:
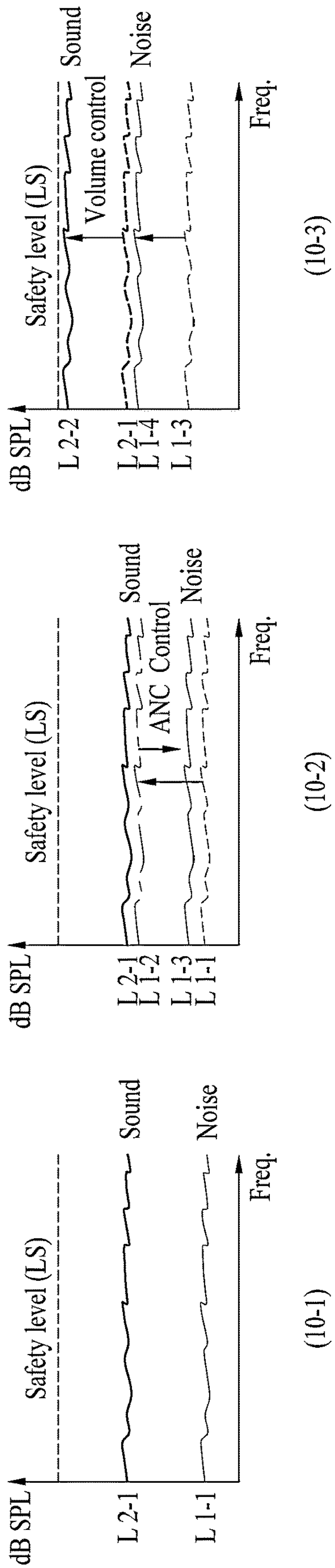
FIG. 10 is a graph for describing an external noise reduction process in FIG. 9.

Hereinafter, with further reference to FIG. 10, the external noise reduction process in FIG. 9 will be described. FIG. 10 is a graph for describing an external noise reduction process in FIG. 9.

(10-1) in FIG. 10 shows the internal noise level L1-1 and the sound source level L2-1 detected in the wireless sound device 200, assuming that the wireless sound device 200 worn by the user is located in the space with the relatively less ambient sound. Because the space has the relatively less ambient sound, the wireless sound device 200 may not need to perform any of the sound volume control and the ANC control.

As shown in (10-2) in FIG. 10, when the internal noise level increases (from L1-1 to L1-2) as the ambient sound increases, the wireless sound device 200 may perform the ACN control first. As the ANC control is performed, the internal noise level may be reduced (from L1-2 to L1-3).

In this regard, when the ambient sound further increases and thus the internal noise level further increases (from L1-3 to L1-4), even when the wireless sound device 200 increases the anti-phase sound wave level for the ANC control up to the maximum allowable value, the internal noise level may not be suppressed.

In this case, as shown in (10-3) in FIG. 10, the wireless sound device 200 may perform the sound volume control while maintaining the sound source level so as not to exceed the safety level LS. That is, the wireless sound device 200 may increase the volume of the sound source (from L2-1 to L2-2) to dominate the internal noise level at a level not exceeding the safety level LS.

Figure 11:
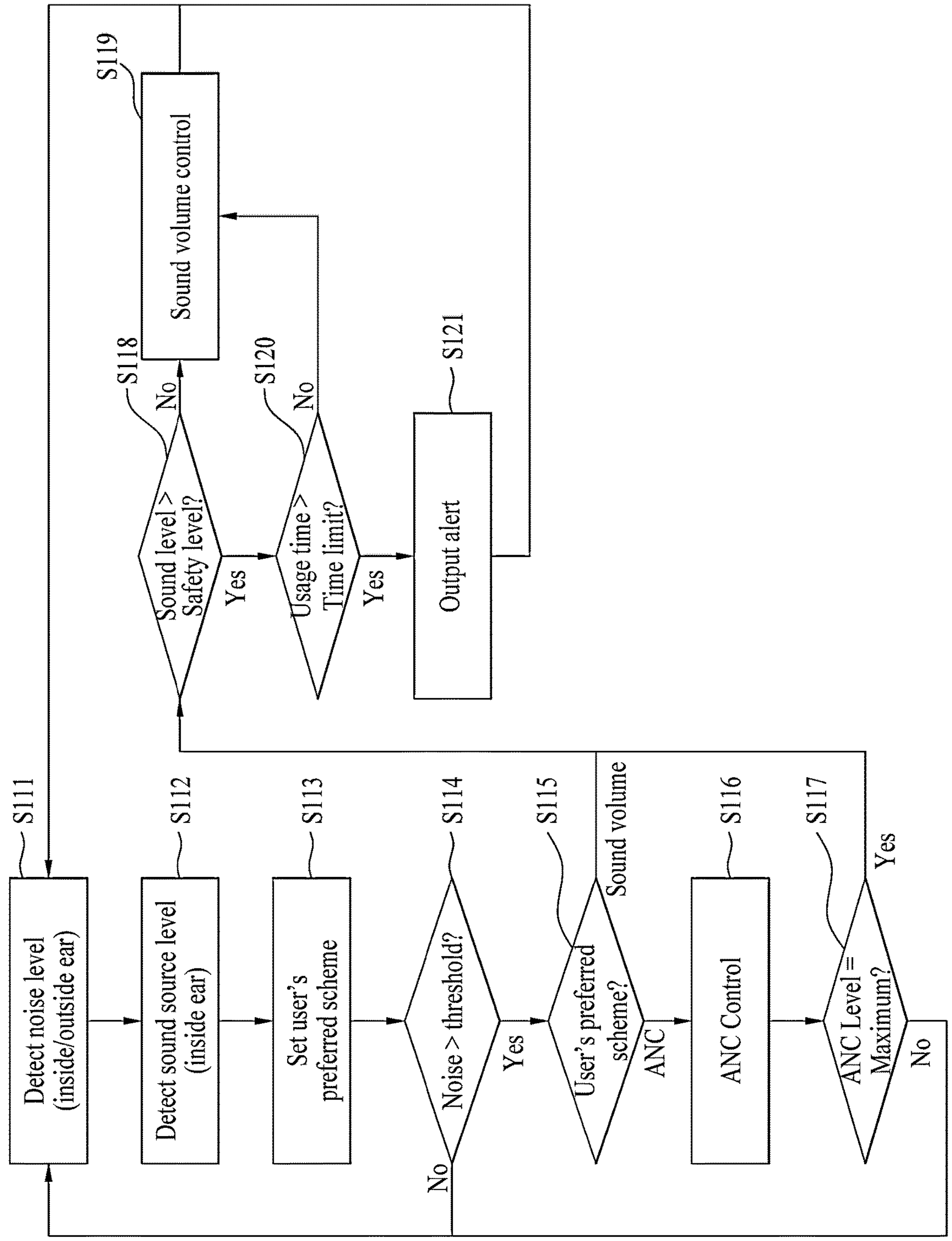
FIG. 11 is an external noise reduction process that may be performed in a wireless sound device according to an embodiment of the present disclosure.

It has been described that, as the level of the internal noise increases, one of the sound volume control and the ANC control is performed first and then the other is performed as necessary. However, a user's preference may be reflected in determining which of the sound volume control and the ANC control to perform first. This will be described further with reference to FIG. 11. FIG. 11 is an external noise reduction process that may be performed in a wireless sound device according to an embodiment of the present disclosure.

The wireless sound device 200 may detect the level of the external noise and the level of the internal noise inside the user's ear via the external microphone 260-1 and the internal microphone 260-2 [S111].

In addition, the wireless sound device 200 may detect the sound source level inside the user's ear via the internal microphone 260-2 [S112].

Step S111 and step S112 may be performed in a reverse order or may be performed virtually simultaneously.

Then, the user may set the user's preferred scheme for which of the sound volume control and the ANC control to perform first in the wireless sound device 200 [S113].

The setting of the user's preferred scheme may be performed via the settings menu for the wireless sound device 200 in the user terminal 100 that is connected to the wireless sound device 200 via the wireless communication.

Via the settings menu, the user may directly select one of the sound volume control and the ANC control as the preferred scheme thereof.

Alternatively, when the user sets a desired sound mode (e.g., a music listening mode, a background music mode, an Internet lecture viewing mode, and the like) via the settings menu, one of the sound volume control and the ANC control may be indirectly selected as the user's preferred scheme based on the set sound mode. For example, when the desired sound mode is set to the music listening mode, the sound volume control may be selected, and when the desired sound mode is set to the background music mode or the internet lecture viewing mode, the ANC control may be selected.

Alternatively, one of the sound volume control and the ANC control may be determined as the user's preferred scheme depending on sound source information (e.g., whether it is music or streaming of an Internet lecture). In addition, one of the sound volume control and the ANC control may be determined as the user's preferred scheme based on a user's accumulated sound adjustment history.

In FIG. 11, step S113 is shown as being performed after steps S111 and S112, but step S113 may be independent of steps S111 and S112 in a sequential relationship.

The wireless sound device 200 may determine whether the internal noise level relative to the detected sound source level is equal to or higher than the preset threshold [S114]. There may be various schemes to perform the determination, but as an example, the determination may be performed in the scheme of determining whether the SNR value between the detected sound source level and the internal noise level is equal to or higher than the preset threshold.

When the internal noise level is lower than the threshold, the process may return to step S111.

However, when the internal noise level is equal to or higher than the threshold as the determination result, the wireless sound device 200 may determine what the user's preferred scheme is [S115].

When the user's preferred scheme is the ANC control scheme, the wireless sound device 200 may perform the ANC control [S116].

That is, the wireless sound device 200 may output the anti-phase sound wave for the ANC control via the speaker 250 such that the internal noise level relative to the detected sound source level becomes lower than the preset threshold. That is, the wireless sound device 200 may lower the internal noise level using the anti-phase sound wave, so that the influence of the internal noise is insignificant.

In this regard, in increasing the level of the anti-phase sound wave such that the internal noise level relative to the detected sound source level becomes lower than the preset threshold, the wireless sound device 200 may monitor whether the level of the anti-phase sound wave reaches the maximum allowable value [S117]. The maximum allowable value may be set as default when the wireless sound device 200 is shipped from the factory, or may be set by the user via the settings menu for the wireless sound device 200 in the user terminal 100 that is connected to the wireless sound device 200 via the wireless communication.

When the anti-phase sound wave level is monitored not to be the maximum allowable value, the process may return to step S111 and the ANC control may be performed such that the internal noise level relative to the detected sound source level in the wireless sound device 200 becomes lower than the preset threshold.

However, when the user's preferred scheme is the sound volume control scheme in step S115 or the anti-phase sound wave level is monitored to be the maximum allowable value in step S117, the wireless sound device 200 may monitor whether the current sound source level is equal to or higher than the safety level [S118].

When the sound level is monitored to be lower than the safety level, the wireless sound device 200 may perform the sound volume control [S119].

When the sound level is equal to or higher than the safety level, the wireless sound device 200 may monitor whether a usage time at the sound source level is equal to or greater than a predetermined time limit [S120]. The predetermined time limit is as described above in relation to FIG. 4. The predetermined time limit may be set as default when the wireless sound device 200 is shipped from the factory, or may be set by the user via the settings menu for the wireless sound device 200 in the user terminal 100 that is connected to the wireless sound device 200 via the wireless communication.

When the usage time at the sound source level is monitored to be smaller than the predetermined time limit, the wireless sound device 200 may perform the sound volume control [S119]. In performing the sound volume control, when the ANC control was previously performed in steps S116 and 117, the wireless sound device 200 may perform the sound volume control while performing the ANC control at the level that no longer increases the level of the anti-phase sound wave.

When the usage time at the sound source level is monitored to be equal to or greater than the predetermined time limit, the wireless sound device 200 may notify that the hearing damage may occur and/or output an alert to guide the user to move to a place with less ambient sound [S121]. Additionally, the alert may suggest the user use the ANC control when the ANC control has not been used yet. The alert may be output from the wireless sound device 200 as a warning sound, or may be transmitted to the user terminal 100 so that the alert is output on a display of the user terminal 100.

Figure 12:
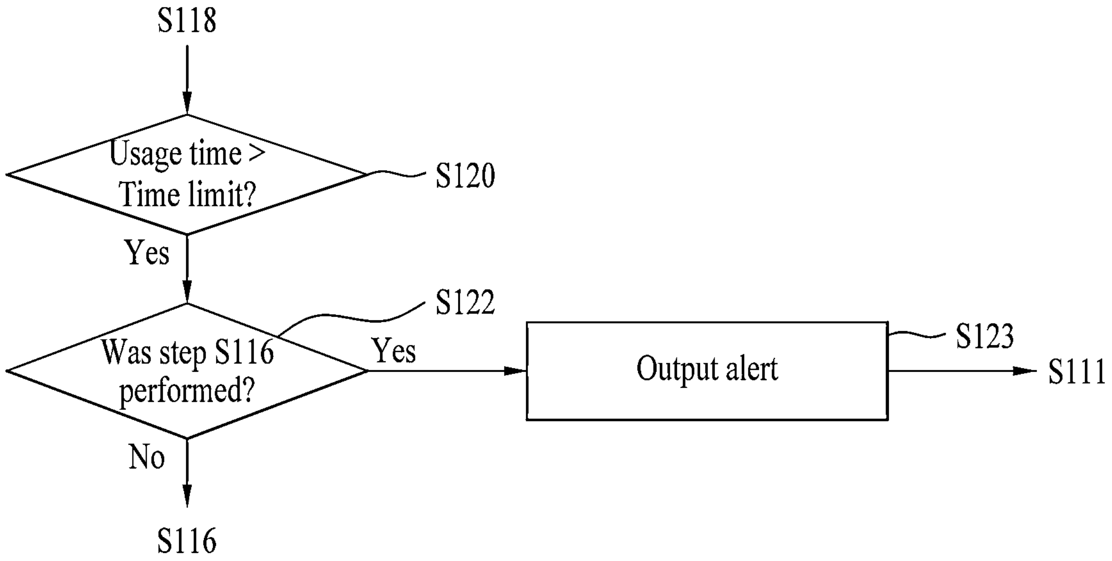
FIG. 12 is a modified example of an external noise reduction process in FIG. 11.

It has been described in FIG. 11 that, when the usage time at the sound source level is monitored to be equal to or greater than the predetermined time limit in step S120, the alert suggests the user use the ANC control when the ANC control has not been used yet. However, the present disclosure may not be limited thereto, and ANC control may be performed immediately without suggesting the user use the ANC control when the usage time at the sound source level is monitored to be equal to or greater than the predetermined time limit and the ANC control has not been used yet. This will be described further with reference to FIG. 12. FIG. 12 is a modified example of an external noise reduction process in FIG. 11.

When the usage time at the sound source level is monitored to be equal to or greater than the predetermined time limit in step S120, the wireless sound device 200 may determine whether step S116 was performed before [S122].

When the wireless sound device 200 did not perform step S116 before as the determination result, the wireless sound device 200 may proceed to step S116.

However, when the wireless sound device 200 performed step S116 before as the determination result, the wireless sound device 200 may notify that the hearing damage may occur and/or output the alert that guides the user to move to the quite place with less ambient sound [S123].

Figure 13:
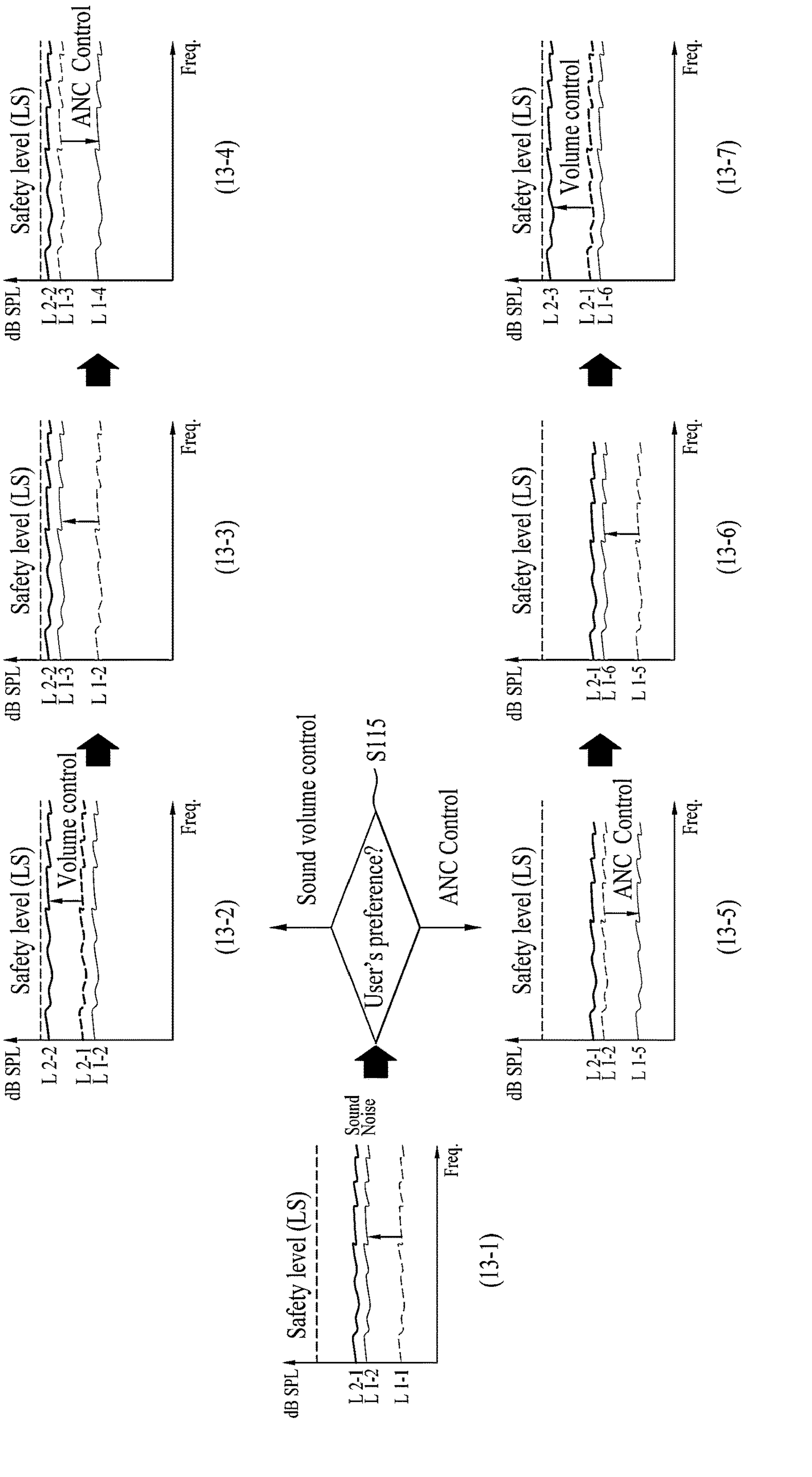
FIG. 13 is a graph for describing an external noise reduction process in FIG. 12.

Hereinafter, with further reference to FIG. 13, the external noise reduction process in FIG. 12 will be described. FIG. 13 is a graph for describing an external noise reduction process in FIG. 12.

As shown in (13-1) in FIG. 13, when the wireless sound device 200 is operating to detect the internal noise level L1-1 and the sound source level L2-1, as the ambient sound increases, the internal noise level may increase (from L1-1 to L1-2).

Then, the wireless sound device 200 may determine what the user's preferred scheme is [S115].

When the user's preferred scheme is the sound volume control scheme, as shown in (13-2) in FIG. 13, the wireless sound device 200 may perform the sound volume control.

That is, the wireless sound device 200 may increase the sound source level (from L2-1 to L2-2) such that the internal noise level relative to the detected sound source level becomes lower than the preset threshold. That is, the wireless sound device 200 may allow the sound source level to be sufficiently high to dominate the internal noise level, so that the influence of the internal noise is insignificant.

However, as shown in (13-3) in FIG. 13, as the ambient sound further increases, the internal noise level may further increase (from L1-2 to L1-3). Then, because the wireless sound device 200 should maintain the sound source level lower than the safety level even though the internal noise level further increases, it may be difficult to reduce the influence of the internal noise using the sound volume control alone.

In this case, as shown in (13-4) in FIG. 13, the wireless sound device 200 may perform the ANC while performing the sound volume control at a level that no longer increases the sound source level or the volume to lower the internal noise (from L1-3 to L1-4), so that the influence of the internal noise may be reduced.

In one example, when the user's preferred scheme is the ANC control scheme, as shown in (13-5) in FIG. 13, the wireless sound device 200 may perform the ANC control.

That is, the wireless sound device 200 may output the anti-phase sound wave for the ANC control via the speaker 250 such that the internal noise level relative to the detected sound source level is lower than the preset threshold. That is, the wireless sound device 200 may lower the internal noise level (from L1-2 to L1-5) using the anti-phase sound wave, so that the influence of the internal noise is insignificant.

However, as shown in (13-6) in FIG. 13, as the ambient sound further increases, the internal noise level may further increase (from L1-5 to L1-6). Then, because the wireless sound device 200 should maintain the level of the anti-phase sound wave lower than the maximum allowable value even though the internal noise level further increases, it may be difficult to reduce the influence of the internal noise with the ANC control alone.

In this case, as shown in (13-7) in FIG. 13, the wireless sound device 200 may perform the sound volume control while performing the ANC control at a level that no longer increases the level of the anti-phase sound wave to increase the sound source level (from L2-1 to L2-3), so that the influence of the internal noise may be reduced.

Figure 14:
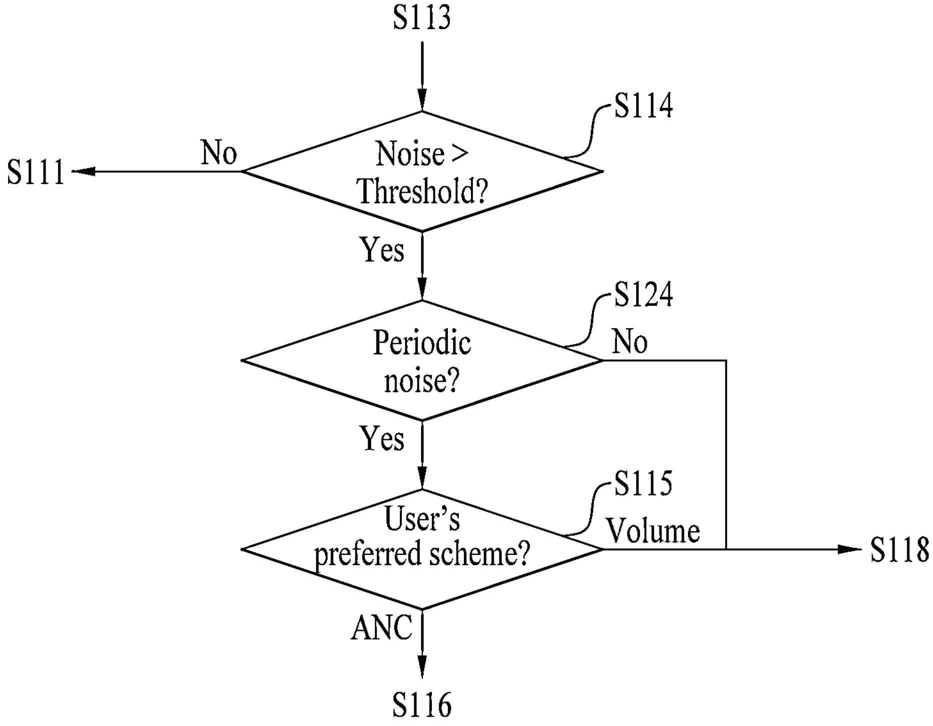
FIG. 14 is a modified example of an external noise reduction process in FIG. 12.

It has been described that one of the sound volume control and the ANC control is performed first based on the user's preferred scheme and then the other is performed as needed. However, when selecting which of the sound volume control and the ANC control to perform first, a pattern of the internal noise may be further considered. This will be described with further reference to FIG. 14. FIG. 14 is a modified example of an external noise reduction process in FIG. 12.

As described above, after step S113, the wireless sound device 200 may determine whether the internal noise level relative to the detected sound source level is equal to or higher than the preset threshold [S114].

When the internal noise level is lower than the threshold as the determination result, the process may return to step S111.

However, when the internal noise level is equal to or higher than the threshold as the determination result, the wireless sound device 200 may measure the pattern of the internal noise [S124].

For example, when the internal noise has the pattern that is periodic and/or has a frequency suitable for the ANC and thus is determined to be suitable for the ANC control as the measurement result, the wireless sound device 200 may determine what the user's preferred scheme is [S115].

When the user's preferred scheme is the ANC control scheme, the wireless sound device 200 may perform step S116.

When the user's preferred scheme is the sound volume control scheme, step S118 may be performed.

Because step S116 and step 118 have been described above, detailed description thereof will be omitted.

On the other hand, when the internal noise has the pattern that is aperiodic and/or has a frequency unsuitable for the ANC and thus is determined to be unsuitable for the ANC control as the measurement result, the wireless sound device 200 may immediately perform step S118 without going through step S115. That is, the wireless sound device 200 may perform the sound volume control first without considering the user's preferred scheme.

Figure 15:
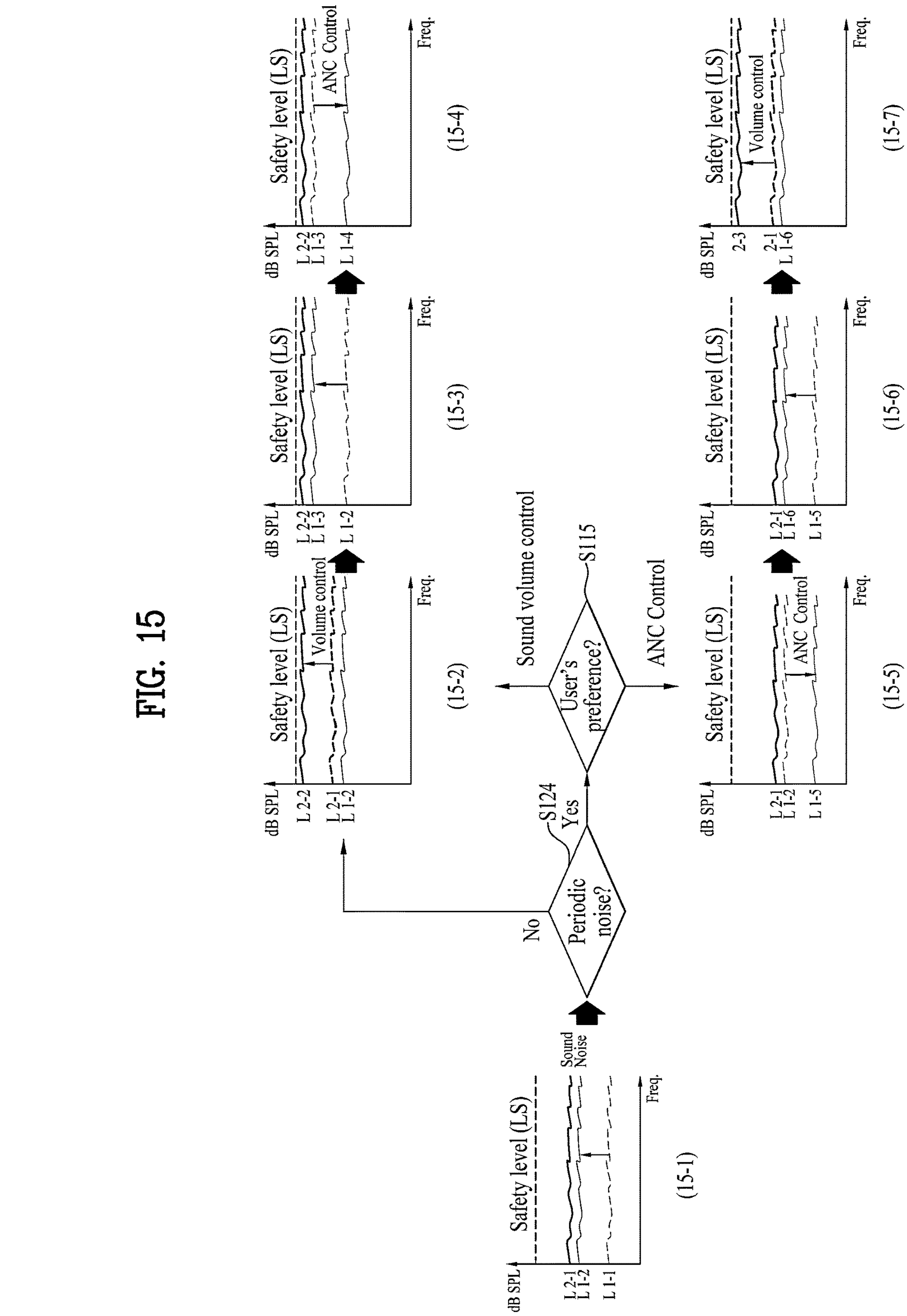
FIG. 15 is a graph for describing an external noise reduction process in FIG. 14.

Hereinafter, with further reference to FIG. 15, the external noise reduction process in FIG. 14 will be described. FIG. 15 is a graph for describing an external noise reduction process in FIG. 14.

As shown in (15-1) in FIG. 15, when the wireless sound device 200 is operating to detect the internal noise level L1-1 and the sound source level L2-1, as the ambient sound increases, the internal noise level may increase (from L1-1 to L1-2).

Then, the wireless sound device 200 may measure the pattern of the internal noise [S124].

For example, when it is determined that the pattern of the internal noise is suitable for the ANC control as the measurement result, the wireless sound device 200 may determine what the user's preferred scheme is [S115].

Operations of the wireless sound device 200 according to (15-2) to (15-7) in FIG. 15 after step S115 based on the user's preferred scheme are as described above in relation to (13-2) to (13-7) in FIG. 13.

On the other hand, for example, when it is determined that the pattern of the internal noise is unsuitable for the ANC control as the measurement result, the wireless sound device 200 may skip step S115 and perform operations according to steps (15-2) to (15-4) in FIG. 15. The operations of the wireless sound device 200 according to (15-2) to (15-4) in FIG. 15 are as described above in relation to (13-2) to (13-4) in FIG. 13.

Figure 16:
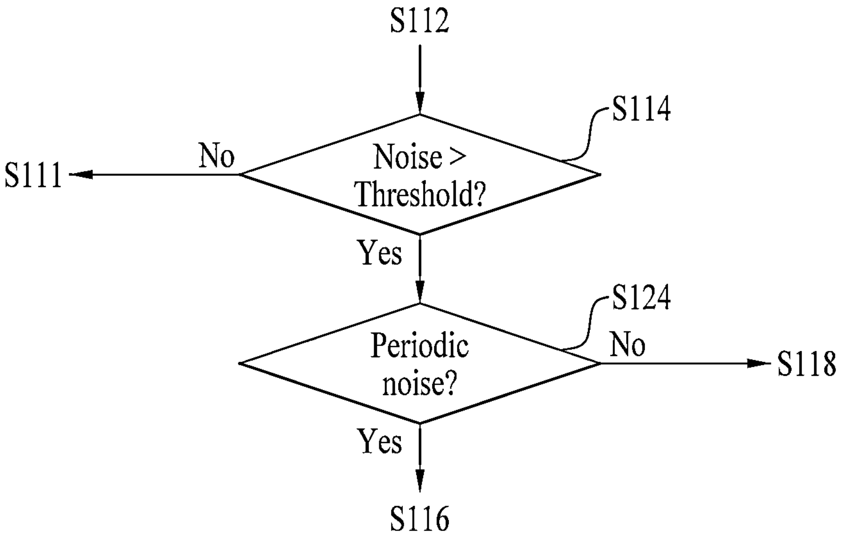
FIG. 16 is a modified example of an external noise reduction process in FIG. 14.

It has been described that, when selecting which of the sound volume control and the ANC control to perform first, not only the user's preferred scheme but also the pattern of the internal noise may be further considered. However, the present disclosure is not limited thereto. When selecting which of the sound volume control and the ANC control to perform first, the user's preferred scheme may not be considered and only the pattern of the internal noise may be considered. This will be described with further reference to FIG. 16. FIG. 16 is a modified example of an external noise reduction process in FIG. 14.

As described above, after step S112, the wireless sound device 200 may determine whether the internal noise level relative to the detected sound source level is equal to or higher than the preset threshold [S114]. That is, step S113 may be omitted.

When the internal noise level is lower than the threshold as the determination result, the process may return to step S111.

However, when the internal noise level is equal to or higher than the threshold as the determination result, the wireless sound device 200 may measure the pattern of the internal noise [S124].

For example, when it is determined that the pattern of the internal noise is suitable for the ANC control as the measurement result, the wireless sound device 200 may perform step S116.

However, when it is determined that the pattern of the internal noise is unsuitable for the ANC control as the measurement result, the wireless sound device 200 may perform step S118.

Because step S116 and step 118 have been described above, detailed description thereof will be omitted.

Figure 17:
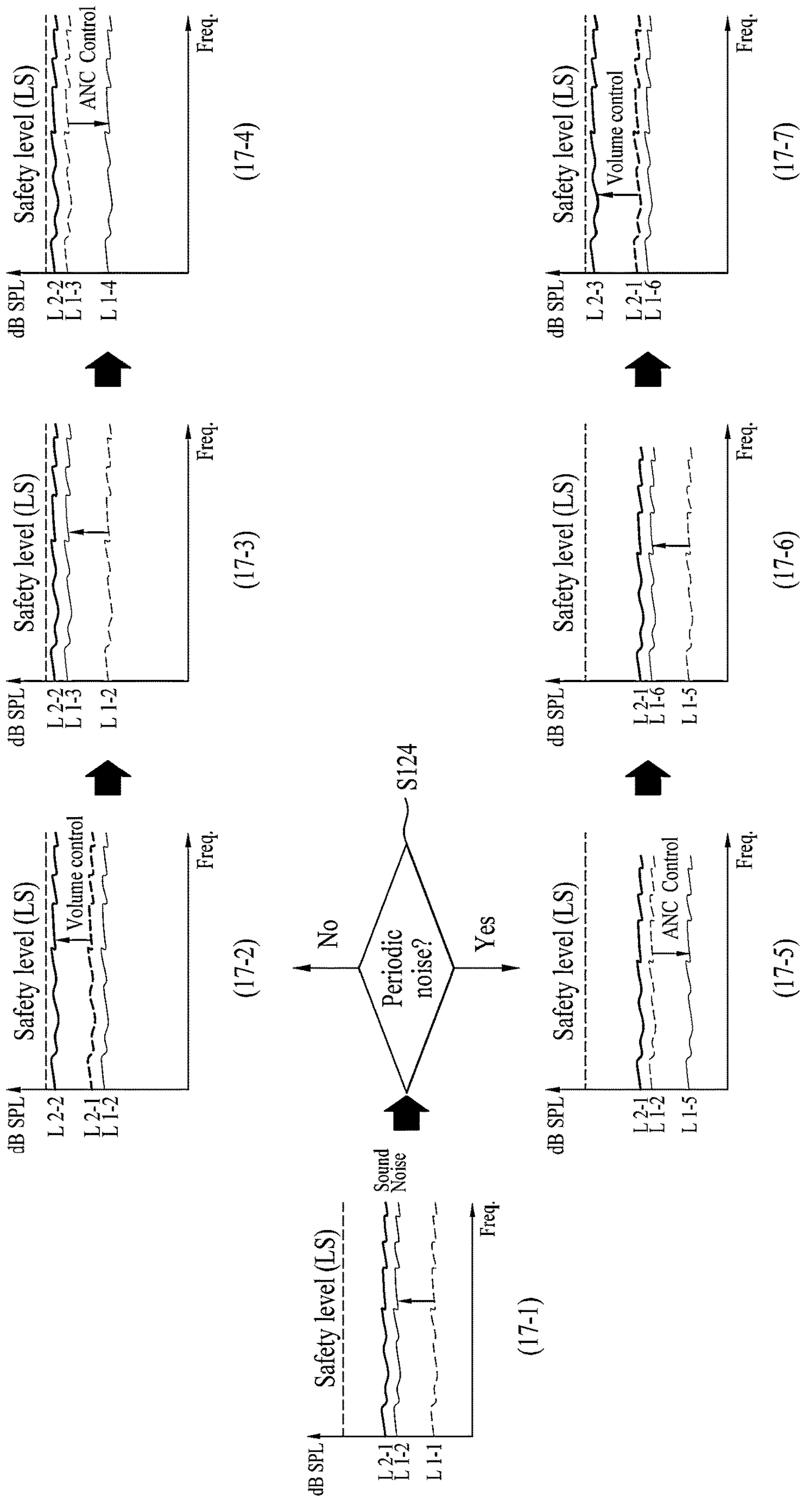
FIG. 17 is a graph for describing an external noise reduction process in FIG. 16.

Hereinafter, with further reference to FIG. 17, the external noise reduction process in FIG. 16 will be described. FIG. 17 is a graph for describing an external noise reduction process in FIG. 16.

As shown in (17-1) in FIG. 17, when the wireless sound device 200 is operating to detect the internal noise level L1-1 and the sound source level L2-1, as the ambient sound increases, the internal noise level may increase (from L1-1 to L1-2).

Then, the wireless sound device 200 may measure the pattern of the internal noise [S124].

For example, when it is determined that the pattern of the internal noise is unsuitable for the ANC control as the measurement result, the wireless sound device 200 may perform operations according to (17-2) to (17-4) in FIG. 17. The operations of the wireless sound device 200 according to (17-2) to (17-4) in FIG. 17 are as described above in relation to (13-2) to (13-4) in FIG. 13.

However, for example, when it is determined that the pattern of the internal noise is suitable for the ANC control as the measurement result, the wireless sound device 200 may perform operations according to (17-5) to (17-7) in FIG. 17. The operations of the wireless sound device 200 according to (17-5) to (17-7) in FIG. 17 are as described above in relation to (13-5) to (13-7) in FIG. 13.

Figure 18:
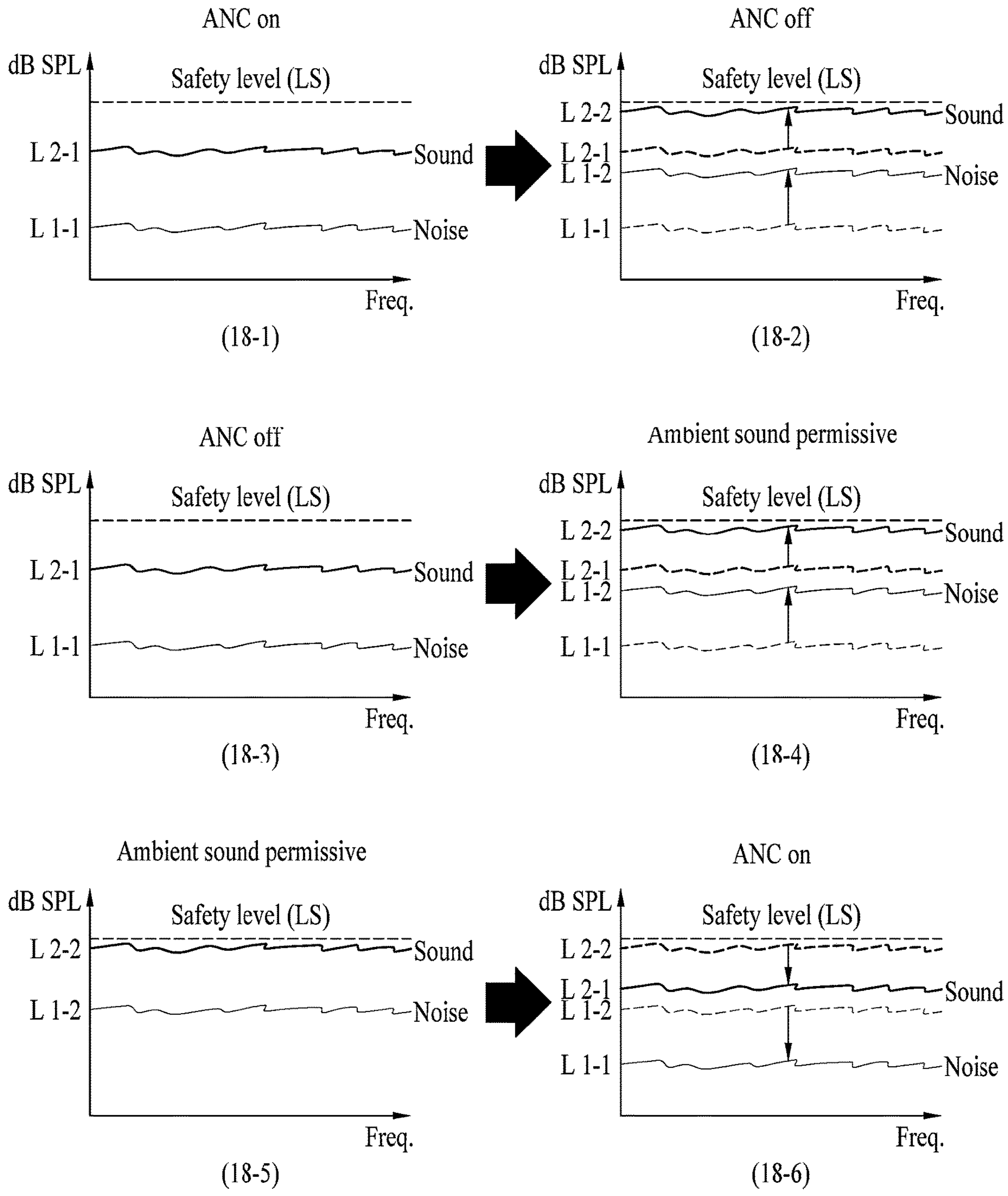
FIG. 18 is a graph for illustrating an external noise reduction process that may be performed in a wireless sound device according to an embodiment of the present disclosure.

The external noise reduction process that may be performed in the wireless sound device 200 when the internal noise level increases as the ambient sound increases has been described. However, even when there is no change in the ambient sound, the external noise may change based on switching between sound-related modes (an ANC on mode/an ANC off mode/an ambient sound permissive mode) of the wireless sound device 200. The external noise reduction process that may be performed in the wireless sound device 200 at this time will be described. FIG. 18 is a graph for illustrating an external noise reduction process that may be performed in a wireless sound device according to an embodiment of the present disclosure.

As there is the switching between the ANC on mode, the ANC off mode, and the ambient sound permissive mode, the wireless sound device 200 may operate in one of those modes.

The ANC on mode is a mode in which the ANC control operates in the wireless sound device 200, and the ANC off mode is a mode in which the ANC control does not operate in the wireless sound device 200. The ambient sound permissive mode is a mode that allows the ambient sound to be heard clearly even though the user is wearing the wireless sound device 200 by allowing the external microphone 260-1 of the wireless sound device 200 to pick up the ambient sound and output the ambient sound via the speaker 250-3.

As shown in (18-1) in FIG. 18, the wireless sound device 200 may operate to detect the internal noise level L1-1 and the sound source level L2-1 in the ANC on mode.

In this regard, the ANC on mode may be switched to the ANC off mode in the wireless sound device 200. The mode switching may be performed, for example, in response to user's manipulation of the user terminal 100 that is connected to the wireless sound device 200 via the wireless communication. Alternatively, the mode switching may be performed in response to an event (e.g., a change in noise pattern) that occurs or is sensed regardless of the user's manipulation in the wireless sound device 200 and/or the user terminal 100.

Then, as shown in (18-2) in FIG. 18, the internal noise level may further increase (from L1-1 to L1-2) as the ANC control does not operate. Then, the wireless sound device 200 may increase the sound source level (from L2-1 to L2-2) such that the internal noise level relative to the detected sound source level becomes lower than the preset threshold, as shown in (18-2) in FIG. 18. That is, the wireless sound device 200 may allow the sound source level to be sufficiently high to dominate the internal noise level, so that the influence of the internal noise is insignificant.

As shown in (18-3) in FIG. 18, the wireless sound device 200 may operate to detect the internal noise level L1-1 and the sound source level L2-1 in the ANC off mode.

In this regard, in the wireless sound device 200, the ANC off mode may be switched to the ambient sound allowing mode. The mode switching may be performed, for example, in response to the user's manipulation of the user terminal 100 that is connected to the wireless sound device 200 via the wireless communication. Alternatively, the mode switching may be performed in response to the event (e.g., the change in the noise pattern) that occurs or is sensed regardless of the user's manipulation in the wireless sound device 200 and/or the user terminal 100.

Then, as shown in (18-4) in FIG. 18, the internal noise level may further increase (from L1-1 to L1-2) as the ambient sound permissive mode is activated. Then, the wireless sound device 200 may increase the sound source level (from L2-1 to L2-2) such that the internal noise level relative to the detected sound source level becomes lower than the preset threshold, as shown in (18-4) in FIG. 18. That is, the wireless sound device 200 may allow the sound source level to be sufficiently high to dominate the internal noise level, so that the influence of the internal noise is insignificant. In one example, although not shown, the wireless sound device may lower the sound source level such that the ambient sound may be heard more clearly based on the ambient sound permissive mode.

As shown in (18-5) in FIG. 18, the wireless sound device 200 may operate to detect the internal noise level L1-2 and the sound source level L2-2 in the ambient sound permissive mode.

In this regard, in the wireless sound device 200, the ambient sound permissive mode may be switched to the ANC on mode. The mode switching may be performed, for example, in response to the user's manipulation of the user terminal 100 that is connected to the wireless sound device 200 via the wireless communication. Alternatively, the mode switching may be performed in response to the event (e.g., the change in the noise pattern) that occurs or is sensed regardless of the user's manipulation in the wireless sound device 200 and/or the user terminal 100.

Then, as shown in (18-6) in FIG. 18, the internal noise level may decrease (from L2-1 to L1-1) as the ANC on mode is activated. Then, the wireless sound device 200 may lower the sound source level (from L2-2 to L2-1) such that the internal noise level relative to the detected sound source level becomes a predetermined SNR level, as shown in (18-6) in FIG. 18.

Figure 19:
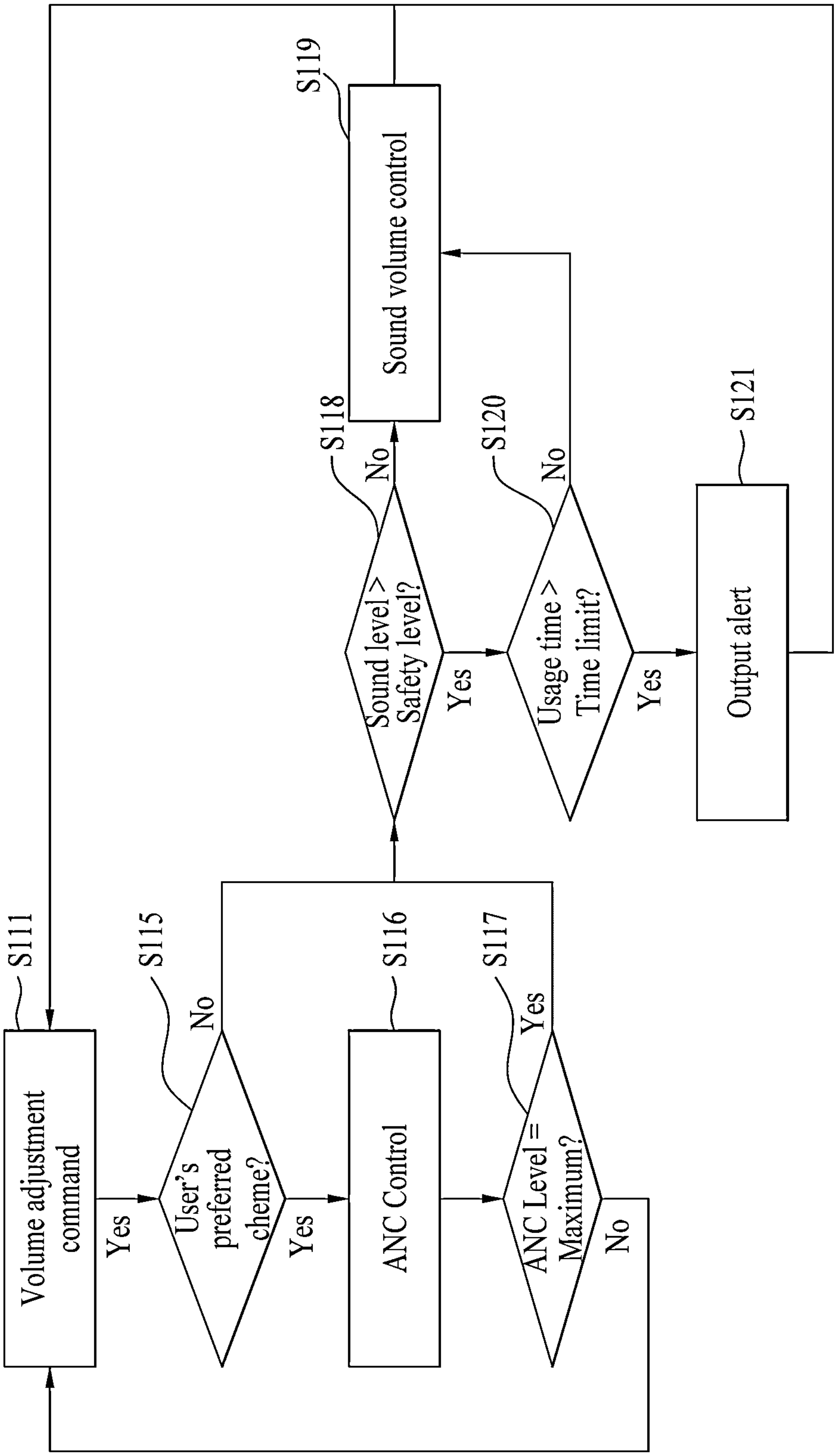
FIG. 19 is a volume control process that may be performed on a wireless sound device according to an embodiment of the present disclosure.

The process in which the wireless sound device 100 performs one of the sound volume control and the ANC control first based on the user's preferred scheme in response to the fact that the internal noise level relative to the detected sound source level is equal to or higher than the preset threshold has been described in FIG. 11. The process is not used only to reduce the external noise. For example, the above process may also be utilized when a volume adjustment command is input from the user. That is, when the volume adjustment command is input from the user, the wireless sound device 100 may perform one of the sound volume control and the ANC control first. This will be described further with reference to FIG. 19. FIG. 19 is a volume control process that may be performed on a wireless sound device according to an embodiment of the present disclosure.

The volume adjustment command to increase the sound volume may be input from the user to the wireless sound device 200 or the user terminal 100 in the wireless communication with the wireless sound device 200 [S125].

In response to the input volume adjustment command, the wireless sound device 200 may determine what the user's preferred scheme is [S115].

When the user's preferred scheme is the ANC control scheme, the wireless sound device 200 may perform the ANC control [S116].

That is, the wireless sound device 200 may output the anti-phase sound wave for the ANC control via the speaker 250 such that it is felt that the sound volume is increasing based on the volume adjustment command, that is, the sound source sound is heard batter. That is, the wireless sound device 200 may lower the internal noise level with the anti-phase sound wave, so that the influence of the internal noise is insignificant, thereby allowing the sound source sound to be heard better.

In increasing the level of the anti-phase sound wave, the wireless sound device 200 may monitor whether the level of the anti-phase sound wave reaches the maximum allowable value [S117].

When the anti-phase sound wave level is monitored not to be the maximum allowable value, the process may return to step S125.

However, when the user's preferred scheme is the sound volume control scheme in step S115 or the anti-phase sound wave level is monitored to be the maximum allowable value in step S117, the wireless sound device 200 may monitor whether the sound source level is equal to or higher than the safety level [S118].

When the sound level is monitored to be lower than the safety level, the wireless sound device 200 may perform the sound volume control [S119]. That is, the wireless sound device 200 may increase the sound source level.

When the sound level is equal to or higher than the safety level, the wireless sound device 200 may monitor whether the usage time at the sound source level is equal to or greater than the predetermined time limit [S120]. The predetermined time limit is as described above in relation to FIG. 4. The predetermined time limit may be set as default when the wireless sound device 200 is shipped from the factory, or may be set by the user via the settings menu for the wireless sound device 200 in the user terminal 100 that is connected to the wireless sound device 200 via the wireless communication.

When the usage time at the sound source level is monitored to be smaller than the predetermined time limit, the wireless sound device 200 may perform the sound volume control [S119]. In performing the sound volume control, when the ANC control was previously performed in steps S116 and 117, the wireless sound device 200 may perform the sound volume control while performing the ANC control at the level that no longer increases the level of the anti-phase sound wave.

When the usage time at the sound source level is monitored to be equal to or greater than the predetermined time limit, the wireless sound device 200 may notify that the hearing damage may occur and/or output the alert to guide the user to move to the place with less ambient sound [S121]. Additionally, the alert may suggest the user use the ANC control when the ANC control has not been used yet. The alert may be output from the wireless sound device 200 as the warning sound, or may be transmitted to the user terminal 100 so that the alert is output on the display of the user terminal 100.

As above, it has been described that the process in FIG. 11 may be utilized even when the volume adjustment command is input from the user. Accordingly, it is obvious that the modified examples of the process in FIG. 11, that is, the processes in FIGS. 12, 14, and 16, may be applied as modified examples of the process in FIG. 19.

Figure 20:
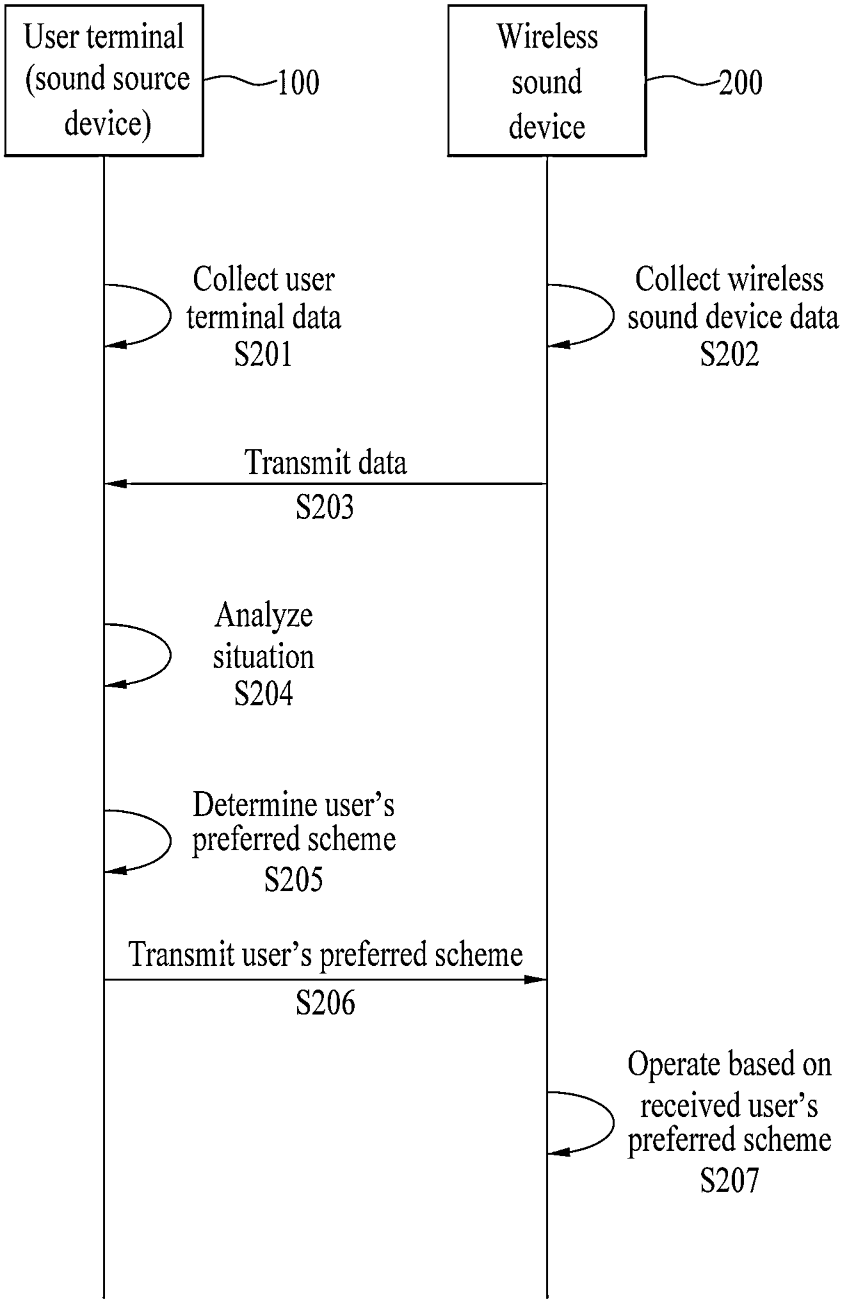
FIG. 20 is a flowchart in which a user's preferred scheme of a wireless sound device is automatically selected according to an embodiment of the present disclosure.

The user's preferred scheme may be determined based on various data collected from the user terminal 100 and the wireless sound device 200. This will be described with further reference to FIG. 20. FIG. 20 is a flowchart in which a user's preferred scheme of a wireless sound device is automatically selected according to an embodiment of the present disclosure.

The user terminal (i.e., the sound source device) 100 may be connected to the wireless sound device 200 via the wireless communication and transmit the sound source to the wireless sound device 200, and the wireless sound device 200 may output the sound source via the sound output unit 250.

In this case, the user terminal 100 (or the controller 180) may collect data regarding a location and/or a movement (e.g., walking, running, riding in the car, staying in a specific place, and the like) of the user based on a location and/or a movement of the user terminal 100 collected via the location information module 115 [S201]. Additionally, the user terminal 100 may collect data regarding the sound source (e.g., a genre of the sound source and the like), data regarding an app for playing the sound source, and/or data regarding the user's sound adjustment history [S201]. The data collected by the user terminal 100 as such will be referred to as user terminal data.

In addition, the wireless sound device 200 may include a sensor including at least one of an acceleration sensor, a magnetic sensor, a gravity sensor (G-sensor), a gyroscope sensor, and a motion sensor. Therefore, the wireless sound device 200 worn in the user's ear may collect data regarding a user's specific movement (e.g., a sitting posture, a lying posture, a standing posture, and the like) based on a movement of the wireless sound device 200 collected via the sensor [S202]. The data collected by the wireless sound device 200 as such will be referred to as wireless sound device data.

The wireless sound device 200 may transmit the wireless sound device data to the user terminal 100 [S203].

Then, the user terminal 100 may analyze a user's situation using at least one of the user terminal data and the wireless sound device data [S204]. Examples of the situation may include i) listening to 'pop music' while 'walking' in 'outdoors' (hereinafter, referred to as a first example), ii) listening to 'quiet music' in a 'library' while 'sitting' (hereinafter, referred to as a second example), iii) listening to a 'learning course' of a 'learning app' on a 'bus' (hereinafter, referred to as a third example), and the like.

The user terminal 100 may determine (or estimate) the user's preferred scheme based on the analyzed situation [S205].

For example, in the case of the first example, it may be assumed that the user's preferred scheme is a user volume control scheme. Further, in the case of the second and third examples, it may be assumed that the user's preferred scheme is the ANC control scheme.

The user terminal 100 may transmit the determined user's preferred scheme to the wireless sound device 200 [206].

The wireless sound device 200 may apply the received user's preferred scheme to the external noise process [S207].

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A wireless sound device comprising:

- a wireless communication unit for being in wireless communication with a sound source device;
- a speaker for outputting a sound source signal received from the sound source device;
- an external microphone for picking up an ambient sound;
- an internal microphone for picking up a sound source and an internal noise inside an ear; and
- a controller for performing sound volume control and ANC control to reduce an influence of the internal noise,
- wherein the controller is configured to perform one of the sound volume control and the ANC control first, and then further perform the other of the sound volume control and the ANC control when the reduction of the internal noise is insufficient.

2. The wireless sound device of claim 1, wherein the controller is configured to:

- perform the sound volume control first; and
- perform the ANC control when the reduction of the internal noise is insufficient even though a level of the picked up sound source reaches a safety critical level during the sound volume control.

3. The wireless sound device of claim 1, wherein the controller is configured to:

- perform the ANC control first; and
- perform the sound volume control when the reduction of the internal noise is insufficient even though a level of an anti-phase sound wave for the ANC control reaches a maximum allowable level during the ANC control.

4. The wireless sound device of claim 1, wherein the controller is configured to perform one of the sound volume control and the ANC control first based on a preset user's preferred scheme when a level of the internal noise is equal to or higher than a preset threshold.

5. The wireless sound device of claim 4, wherein the controller is configured to perform one of the sound volume control and the ANC control first based further on a pattern of the internal noise.

6. The wireless sound device of claim 5, wherein the controller is configured to perform the sound volume control first without considering the user's preferred scheme when the pattern of the internal noise is unsuitable for the ANC control.

7. The wireless sound device of claim 5, wherein the controller is configured to perform one of the sound volume control and the ANC control first in consideration of the user's preferred scheme when the pattern of the internal noise is suitable for the ANC control.

8. The wireless sound device of claim 4, wherein the controller is configured to perform one of the sound volume control and the ANC control first based on the user's preferred scheme when a volume adjustment command to increase a sound volume is input.

9. The wireless sound device of claim 4, wherein the user's preferred scheme is automatically determined based on at least one of user's movement information, sound source information, and sound adjustment history information.

10. The wireless sound device of claim 1, wherein the controller is configured to perform one of the sound volume control and the ANC control first based on a pattern of the internal noise.

11. A method for controlling a wireless sound device, the method comprising:

- performing wireless communication with a sound source device;
- outputting a sound source signal received from the sound source device via a speaker;
- picking up an ambient sound via an external microphone;
- picking up a sound source and an internal noise inside an ear via an internal microphone; and
- performing sound volume control and ANC control to reduce an influence of the internal noise,
- wherein one of the sound volume control and the ANC control is performed first, and then the other of the sound volume control and the ANC control is further performed when the reduction of the internal noise is insufficient.

12. The method of claim 11, further comprising:

- performing the sound volume control first; and
- performing the ANC control when the reduction of the internal noise is insufficient even though a level of the picked up sound source reaches a safety critical level during the sound volume control.

13. The method of claim 11, further comprising:

- performing the ANC control first; and
- performing the sound volume control when the reduction of the internal noise is insufficient even though a level of an anti-phase sound wave for the ANC control reaches a maximum allowable level during the ANC control.

14. The method of claim 11, wherein one of the sound volume control and the ANC control is performed first based on a preset user's preferred scheme when a level of the internal noise is equal to or higher than a preset threshold.

15. The method of claim 14, wherein one of the sound volume control and the ANC control is performed first based further on a pattern of the internal noise.

16. The method of claim 15, wherein the sound volume control is performed first without considering the user's preferred scheme when the pattern of the internal noise is unsuitable for the ANC control.

17. The method of claim 15, wherein one of the sound volume control and the ANC control is performed first in consideration of the user's preferred scheme when the pattern of the internal noise is suitable for the ANC control.

18. The method of claim 14, further comprising performing one of the sound volume control and the ANC control first based on the user's preferred scheme when a volume adjustment command to increase a sound volume is input.

19. The method of claim 14, wherein the user's preferred scheme is automatically determined based on at least one of user's movement information, sound source information, and sound adjustment history information.

20. The method of claim 11, wherein one of the sound volume control and the ANC control is performed first based on a pattern of the internal noise.

* * * * *